United States Patent
Abrahamson

(10) Patent No.: US 9,621,526 B2
(45) Date of Patent: Apr. 11, 2017

(54) CONTENT ENCRYPTION AND DECRYPTION

(71) Applicant: OTP Technologies, Inc., Washington, UT (US)

(72) Inventor: John Carter Abrahamson, Leeds, UT (US)

(73) Assignee: OTP TECHNOLOGIES, INC., Washington, UT (US)

(*) Notice: Subject to any disclaimer, the term of this patent is extended or adjusted under 35 U.S.C. 154(b) by 0 days.

(21) Appl. No.: 14/683,796

(22) Filed: Apr. 10, 2015

(65) Prior Publication Data

US 2015/0295907 A1   Oct. 15, 2015

Related U.S. Application Data

(60) Provisional application No. 61/977,620, filed on Apr. 10, 2014.

(51) Int. Cl.
*H04L 29/06* (2006.01)
*H04L 9/06* (2006.01)
*H04W 4/00* (2009.01)

(52) U.S. Cl.
CPC .......... *H04L 63/065* (2013.01); *H04L 9/0656* (2013.01); *H04L 63/0428* (2013.01); *H04L 63/067* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 8,458,452 B1* | 6/2013 | Morgan | H04L 63/0428 713/150 |
| 2003/0026431 A1 | 2/2003 | Hammersmith | |
| 2006/0034456 A1* | 2/2006 | McGough | H04L 9/0844 380/30 |
| 2007/0297602 A1* | 12/2007 | Hull | G06F 21/602 380/28 |

FOREIGN PATENT DOCUMENTS

WO    02/19610 A2    3/2002

OTHER PUBLICATIONS

International Search Report dated Jul. 24, 2015 as received in Application No. PCT/US2015/025476.
Written Opinion of the International Searching Authority dated Jul. 24, 2015 as received in Application No. PCT/US2015/025476.

\* cited by examiner

*Primary Examiner* — Brandon Hoffman
(74) *Attorney, Agent, or Firm* — Maschoff Brennan

(57) ABSTRACT

A method of sharing secure content in a group may include receiving a one-time pad (OTP) key. The method may include encrypting content using the OTP key. The encrypting may include generating intermediate codes from the content and the OTP key. The encrypting may also include adding a first common constant to each of the intermediate codes to generate a corresponding encrypted code that includes a predetermined number of digits. The method may include sending encrypted content that includes encrypted codes corresponding to the intermediate codes.

17 Claims, 18 Drawing Sheets

| Text 402 | This is a pear | | | | | | | | | | | | |
|---|---|---|---|---|---|---|---|---|---|---|---|---|---|
| Text Characters 404 | T | h | i | s | space | i | s | space | a | space | p | e | a | r |
| Text Character Values 406 | 84 | 104 | 105 | 115 | 32 | 105 | 115 | 32 | 97 | 32 | 112 | 101 | 97 | 114 |
| Secret Key 408 | V^Evgt/cD&<Q\m | | | | | | | | | | | | |
| Key Characters 410 | V | ^ | E | v | g | t | / | c | D | & | < | Q | \ | m |
| Key Character Values 412 | 86 | 94 | 69 | 118 | 103 | 116 | 47 | 99 | 68 | 38 | 60 | 81 | 92 | 109 |

| Group Name 704 | | | | | | |
|---|---|---|---|---|---|---|
| Name Characters 706 | f | r | i | e | n | d | s |
| Numerical Name Values 708 | 102 | 114 | 105 | 101 | 110 | 100 | 115 |

← 710 An even number

| Custom Key 724 | | | | | | | | | | | | | | |
|---|---|---|---|---|---|---|---|---|---|---|---|---|---|---|
| Character Position 726 | 104 | 105 | 106 | 107 | 108 | 109 | 110 | 111 | 112 | 113 | 114 | 115 | 116 | 117 |
| Character 728 | c | A | B | C | D | E | F | G | H | a | b | c | e | d |
| Numerical Value 730 | 107 | 65 | 66 | 67 | 68 | 69 | 70 | 71 | 72 | 105 | 106 | 107 | 109 | 108 |

Integer $I_1 = 567$    Integer $I_2 = 890$    Integer $I_3 = 1205$

CONTENT ENCRYPTION AND DECRYPTION

CROSS-REFERENCE TO RELATED APPLICATIONS

This application claims the benefit of priority of U.S. Provisional Application No. 61/977,620, entitled "Content Encryption and Decryption" filed Apr. 10, 2014. The entirety of the foregoing application is incorporated herein by reference.

FIELD

Some embodiments described herein generally relate to encrypting and decrypting content using one-time pad (OTP) techniques.

BACKGROUND

Unless otherwise indicated herein, the materials described herein are not prior art to the claims in the present application and are not admitted to be prior art by inclusion in this section.

Information communicated between at least two communication parties may be encrypted to avoid eavesdropping or other security attacks. Perfect secrecy of the information may be achieved if OTP techniques are used to encrypt the information. However, in the OTP techniques a secret key may be used only once and may have a key size no less than a size of the content to be encrypted. It may be a challenge to generate a large number of secret keys to encrypt a large amount of content. It may also be a challenge to distribute the secret keys safely between the communication parties.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to encrypting and decrypting content using OTP techniques.

In an example embodiment, a method of sharing secure content in a group may include receiving a one-time pad (OTP) key. The method may include encrypting content using the OTP key. The encrypting may include generating intermediate codes from the content and the OTP key. The encrypting may also include adding a first common constant to each of the intermediate codes to generate a corresponding encrypted code that includes a predetermined number of digits. The method may include sending encrypted content that includes encrypted codes corresponding to the intermediate codes.

In another example embodiment, a method of generating keys in a group may include receiving a digital stream of data that describes a key source. The method may include converting the digital stream of data to numerical values that satisfy a key range. The method may include converting the numerical values to corresponding characters. The method may include generating a unique secret key that includes the corresponding characters.

In yet another example, a computer program product comprising a non-transitory computer-readable medium including computer-readable instructions stored thereon is described. Execution of a first portion of the computer-readable instructions on a first client device may cause the first client device to: receive a digital stream of data that describes a common key source; generate a custom key from the common key source; create a group of OTP keys using the custom key; encrypt content using an OTP key from the group of OTP keys; and communicate the encrypted content and an identifier of the OTP key from the first client device to a second client device, the identifier of the OTP key configured to identify the OTP key from the group of OTP keys. Execution of a second portion of the computer-readable instructions on the second client device may cause the second client device to: receive the digital stream of data that describes the common key source; generate the custom key from the common key source; create the group of OTP keys using the custom key; receive the encrypted content and the identifier of the OTP key from the first client device; identify the OTP key from the group of OTP keys using the identifier of the OTP key; and decode the encrypted content using the OTP key.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 4A and 4B include graphic representations that illustrate aspects of an example embodiment of the method of FIG. 2;

FIGS. 7A and 7B include graphic representations that illustrate aspects of an example embodiment of the method of FIGS. 6A-6E;

FIG. 8 includes a graphic representation that illustrates part of an example image represented in its digital form;

DETAILED DESCRIPTION OF SOME EXAMPLE EMBODIMENTS

Figure 1:
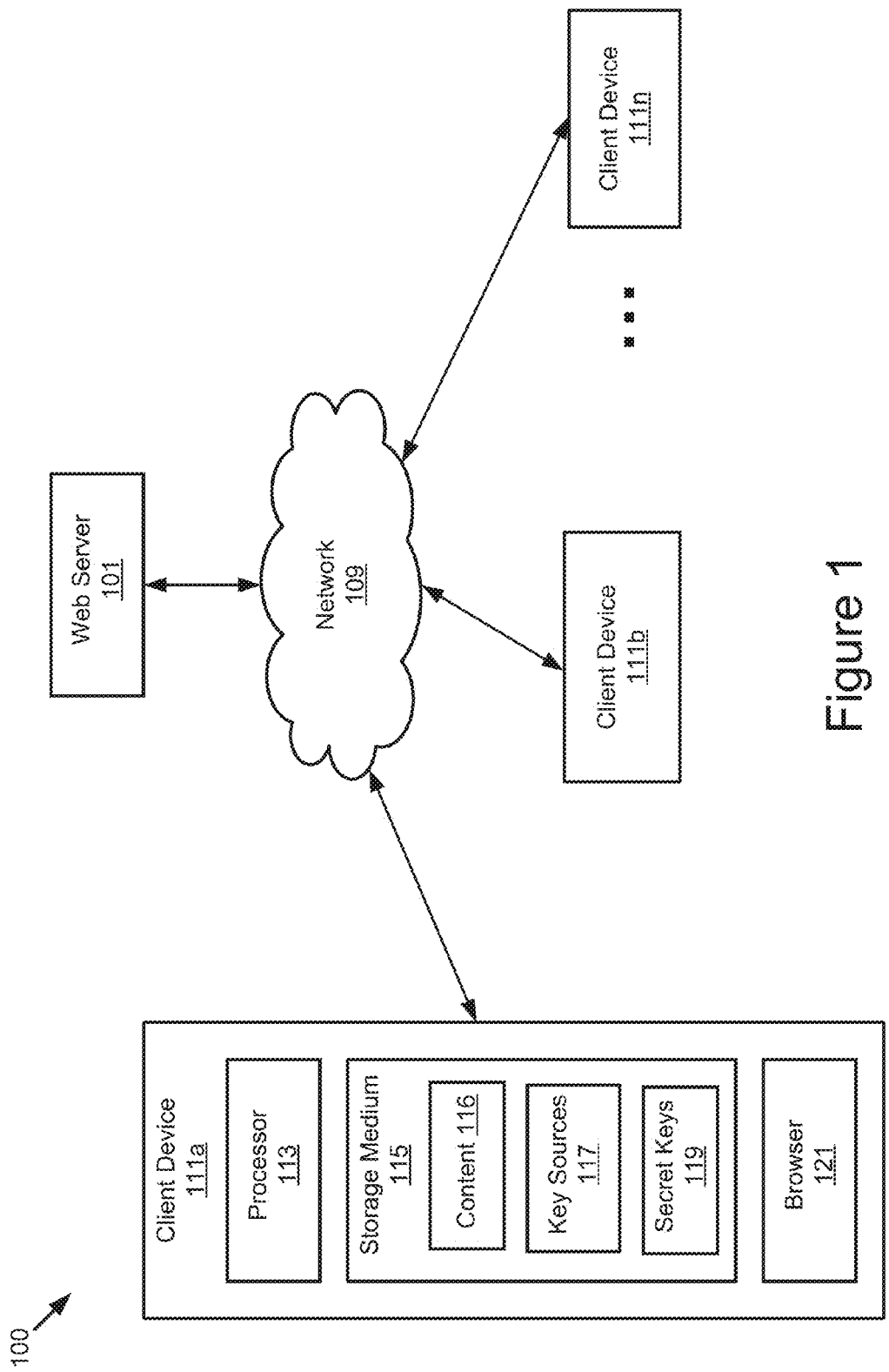
FIG. 1 is a block diagram of an example operating environment that includes a web server and one or more client devices configured to share secure content in a group.

Embodiments described herein generally relate to techniques for encrypting and decrypting content.

Some embodiments described herein may allow the establishment of groups of users or groups of client devices for secure communication between members in the respective groups. For example, an email group that includes multiple email addresses may be created so that secure email communication may be achieved between members in the email group. In some embodiments, a user or a client device may be a member of different groups at the same time. Each group of users or client devices may have one or more different secret key groups, and each secret key group may include one or more unique secret keys. In some embodiments, content (e.g., emails, attachments in emails, audio data such as phone calls, documents, files, text messages, blogs, social media information, secure socket layer (SSL) communications, or any other type of content) to be shared in a group may be encrypted using a unique secret key with OTP techniques. A message that includes the encrypted content may be delivered to one or more other members in the group. The one or more other members in the group may use the unique secret key to decrypt the content from the message.

In some embodiments, the content to be shared in the group may be encrypted by performing one or more of the following operations: (1) converting characters in the content to first American Standard Code for Information Interchange (ASCII) values; (2) converting characters in the unique secret key to second ASCII values; (3) adding corresponding first ASCII values to corresponding second ASCII values to generate corresponding intermediate codes; and (4) adding a common constant (e.g., 32 or another suitable integer constant) to each of the intermediate codes to generate corresponding encrypted codes so that each encrypted code may have a predetermined number of digits. For example, each encrypted code may include a three-digit code (e.g., 100≤an encrypted code≤999) or a five-digit code (e.g., 10,000≤an encrypted code≤99,999). In some embodiments, the predetermined number of digits for each encrypted code may include an integer between 3 and 6 (e.g., 3≤the predetermined number of digits≤6). In other embodiments, the predetermined number of digits for each encrypted code may be greater than 6 or between 1 and 6. The encrypted content may include the encrypted codes.

Some embodiments described herein may alternately or additionally include generating unique secret keys from key sources such as images, web pages, audio and/or video files, text files, documents, or other key sources. A unique secret key may be generated from a key source by performing one or more of: (1) loading a digital stream of data that describes the key source; (2) deleting some data from the digital stream of data; (3) converting a remainder portion of the digital stream of data to numbers that satisfy a key range (e.g., a key range of [32, 122] or a key range that includes [65, 90] and [91, 122]); and (4) converting the numbers to corresponding ASCII characters. The unique secret key may include the converted numbers that satisfy the key range and/or the converted ASCII characters. In some embodiments, punctuation characters may be removed from the unique secret key.

In some embodiments, each group of users or each group of client devices may share multiple unique secret keys classified into one or more secret key groups. Each secret key group may include one or more unique secret keys. The unique secret keys may be generated by a member in the group of users or the group of client devices and may be shared with other members in the group using a universal serial bus (USB) drive or other portable computer-readable medium (e.g., memory cards such as secure digital (SD) cards, compact discs (CDs), digital versatile discs (DVDs)). Alternatively, each member in the group may obtain common key sources and may generate matching secret keys from the common key sources, respectively. Each member in the group may store a copy of the secret keys for content encryption and decryption. Each secret key may be used to encrypt content only once and may be deleted after one-time use or may be flagged or otherwise identified as ineligible for subsequent use except to decrypt the corresponding encrypted content. The secret keys may be referred to as OTP keys herein.

The embodiments described herein may be embodied in computer-readable instructions such as software, an application, and/or an app executed on or by a computing device such as a desktop or laptop computer or a smartphone, among others. The software, application, and app, and/or multiple distributed instances thereof on multiple different computing devices may be referred to as an encoding system, a decoding system, an encoding/decoding system, an encryption system, a decryption system, and/or an encryption/decryption system (generically referred to hereinafter as the "system"). The system may make browsing the web or the Internet more safe, at least in terms of privacy.

It is common today for many websites (and even emails) to include things like "Super Cookies" and "Pixel Tags". These can interfere with the storing of images. Embodiments of the system described herein may remove the Super Cookies and Pixel Tags. The ability to remove Pixel Tags to enhance transfer of encoded (or encrypted) files may also protect the computer user from being tracked by things like Pixel Tags. Inside a webpage or email a pixel tag may not be discernable by the naked eye, but to the system it may stand out as a 1×1 pixel gif. The system may identify Pixel Tags and filter them out or otherwise remove them.

The system may alternately or additionally allow secure transfer of personal data like social security numbers, driver's license numbers, and/or other personal data. New flaws in the SSL transfer of data seem to be exposed on a regular basis, sometimes weekly. Embodiments of the system described herein may allow this sort of transfer to take place much more securely. For example: A bank may need information from a borrower; the borrower may encode (or encrypt) the information using an OTP key as described herein. Half of the OTP data may be found on a requesting web page and the other half may be a key from the borrower.

The bank's key may include a single frame of a video. The frames may be in constant state of change but each frame may include an identifying number that may allow it to be used as an OTP. After use the OTP key may be replaced.

Alternately or additionally, embodiments of the system described herein may be used in a Virtual Private network (VPN) that utilizes the world wide web. Each user's keys may be used in conjunction with a series of web keys. The web keys may be interpreted by each user's personal keys to allow contacts in the same group to send all data encoded with a new key.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 is a block diagram of an example operating environment 100 that includes a web server 101 and client devices 111a, 111b . . . 111n (also referred to collectively or individually as client device 111), arranged in accordance with at least some embodiments described herein. The client devices 111a, 111b . . . 111n may be configured to form a group and to share secure content within the group. Although one web server 101 and three client devices 111a, 111b, 111n are illustrated in FIG. 1, the operating environment 100 may more generally include any number of web servers 101 and/or any number of client devices 111. In these and other embodiments, the operating environment 100 may include other servers and/or devices not illustrated in FIG. 1, such as an image hosting server or other server that hosts any content suitable for use as a key source.

The operating environment 100 may additionally include a network 109. In general, the network 109 may include one or more wide area networks (WANs) and/or local area networks (LANs) that enable the web server 101 and the client devices 111a, 111b . . . 111n to communicate with each other. In some embodiments, the network 109 may include the Internet, including a global internetwork formed by logical and physical connections between multiple WANs and/or LANs. Alternately or additionally, the network 109 may include one or more cellular radio frequency (RF) networks and/or one or more wired and/or wireless networks such as, but not limited to, 802.xx networks, Bluetooth access points, wireless access points, Internet Protocol (IP)-based networks, or the like. The network 109 may also include servers that enable one type of network to interface with another type of network.

In general, the web server 101 may host a website that includes one or more web pages and that may allow the client devices 111a, 111b . . . 111n to access the one or more web pages using an application such as a browser. Each of the client devices 111a, 111b . . . 111n may execute an application, such as a browser 121, configured to communicate through the network 109 with the web server 101. The browser 121 may include an Internet browser or other suitable application for communicating through the network 109 with the web server 101. The browser 121 may download and/or interact with content, such as websites that include web pages, documents, and/or applications hosted by the web server 101 or other servers (not shown) in the operating environment 100. For example, a document and/or a web page published on the web server 101 may be accessed and/or downloaded by the browser 121 on the client device 111a.

Each of the client devices 111a, 111b . . . 111n may include, but is not limited to, a desktop computer, a laptop computer, a tablet computer, a mobile phone, a smartphone, a personal digital assistant (PDA), a wearable device (e.g., a smart watch), or another suitable client device. Each of the client devices 111a, 111b . . . 111n may additionally include a processor and a storage medium, such as a processor 113 and a storage medium 115 as illustrated for the client device 111a in FIG. 1. Each of the other client devices 111b . . . 111n may be similarly configured.

The processor 113 may be of any type including, but not limited to, a central processing unit (CPU), a microprocessor ($\mu$P), a microcontroller ($\mu$C), a digital signal processor (DSP), or any combination thereof. The processor 113 may be configured to execute computer instructions that, when executed, cause the processor 113 to perform one or more of the operations described herein with respect to the client device 111a and/or the browser 121.

The storage medium 115 may include volatile memory such as random access memory (RAM), persistent or non-volatile storage including, but not limited to, read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 115 may store computer instructions that may be executed by the processor 113 to perform one or more of the operations described herein with respect to the client device 111a and/or the browser 121.

In some embodiments, the storage medium 115 may store, at least temporarily, content 116, key sources 117, and/or secret keys 119. The content 116 may include data to be shared with other client devices. Examples of the content 116 may include, but are not limited to, emails, attachments in emails, documents, files, voice data (e.g., phone calls), text messages (e.g., instant messages, short message service (SMS) messages, multimedia message service (MMS) messages), blogs, social media information (e.g., posts, sharings, reposts), and any other types of content. The key sources 117 may include data used to generate unique secret keys. Example key sources 117 may include, but are not limited to, web pages, images, documents, files, and any other types of data sources.

The secret keys 119 may include unique secret keys configured for one or more groups. Each group may be associated with multiple unique secret keys classified into different secret key groups. For example, each group of client devices 111 or each group of users may be assigned with one or more groups of unique secret keys. Each client device 111 in a group may store a copy of the unique secret keys configured for that group, so that the unique secret keys may be used to encrypt and decrypt content in that group.

In some embodiments, the client devices 111a, 111b, and 111n may be in the same group. The client devices 111a, 111b, and 111n may share one or more key sources (e.g., images, web pages) in common and may generate one or more common secret keys from the one or more key sources, respectively. Alternatively, a first member in the group (e.g., the client device 111a) may use the one or more key sources to generate unique secret keys and may share the unique secret keys with other members in the group using a universal serial bus (USB) drive or any other portable storage medium such as memory cards, CDs, and DVDs. The client devices 111a, 111b, and 111n in the group may use the unique secret keys to share secure content in the group. For example, the client device 111a may use a unique secret key to encrypt a piece of content. The client device 111a may send a message that includes the encrypted piece of content to the client devices 111b and 111n. In turn, the client devices 111b and 111n may use their own copies of the unique secret key to decrypt the message. In some embodiments, OTP techniques may be used in an encryption and decryption process. For example, a size of the unique secret key used to encrypt the content may be no less than a size of the content and the unique secret key may be used only once. The unique secret key may be deleted from the group after one-time use.

Alternately, the unique secret key may be flagged or otherwise identified as ineligible for subsequent use on other content. In these and other embodiments, the used secret key may be retained to decrypt a saved version of the corresponding encrypted content without being used to encrypt other content.

Figure 2:
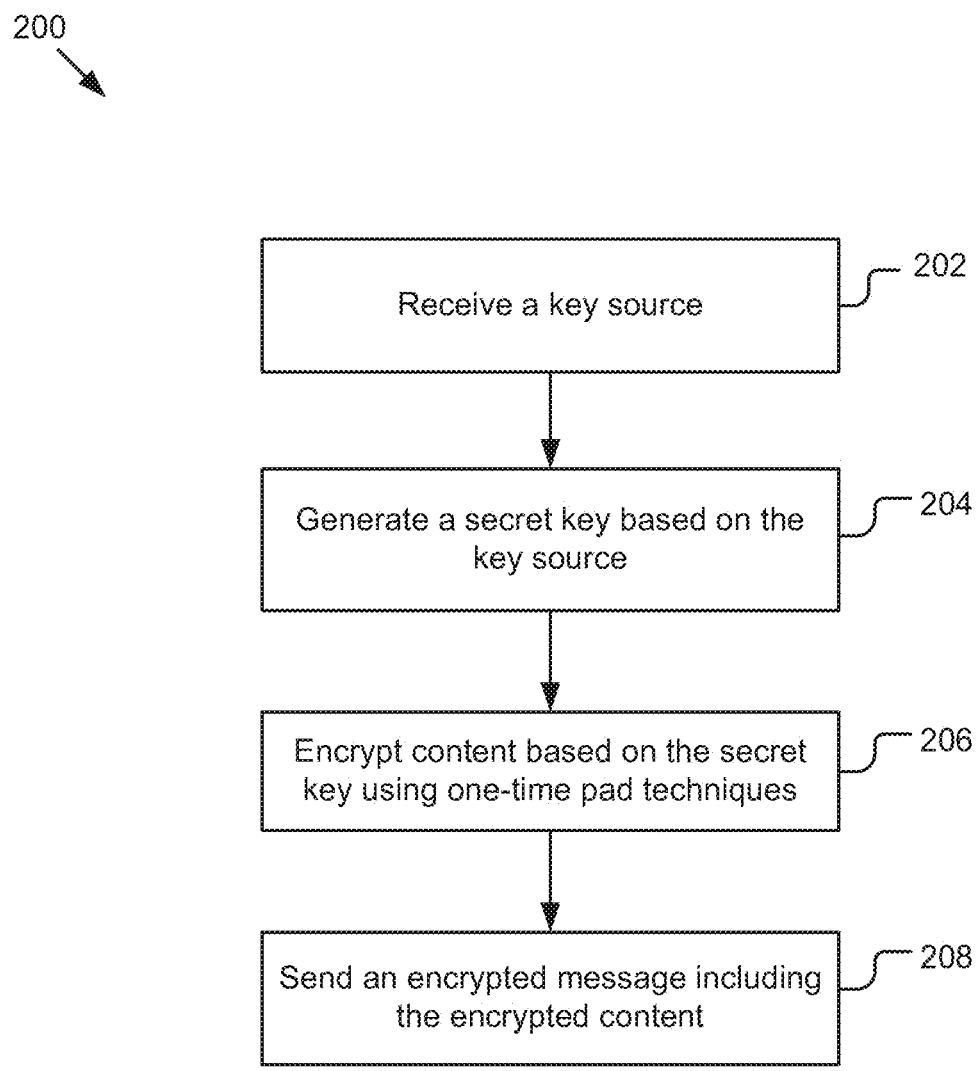
FIG. 2 shows an example flow diagram of a method to share secure content in a group.

FIG. 2 shows an example flow diagram of a method 200 of sharing secure content in a group, arranged in accordance with at least some embodiments described herein. The method 200 may be performed in whole or in part by, e.g., any of the client devices 111a, 111b . . . 111n of FIG. 1. Although illustrated as discrete blocks, various blocks may be divided into additional blocks, combined into fewer blocks, or eliminated, depending on the desired implementation.

The method 200 may begin at block 202 in which a key source may be received. For example, a user associated with a client device 111 performing the method 200 may select an image, a web page, a document, a file, or any other key source for secret key generation. In another example, a browser on the client device 111 (e.g., the browser 121 on the client device 111a) may receive data describing a web page from the web server 101. To maintain secrecy of the unique secret keys, the key source may be known to members in the group but unknown to other users or other client devices not in the group.

At block 204, a unique secret key may be generated based on the key source. In some embodiments, a digital stream of data describing the key source may be loaded in a memory associated with the client device 111 performing the method 200. For example, the key source may include an image, and the digital stream of data may include numerical values used to render or display the image. The numerical values used to render or display the image may include values representing tones, contrast, colors, tints, and/or any other characteristics of the image. In another example, the key source may include a web page, and the digital stream of data may include numerical values used to render the web page. The numerical values may include values representing a format, a structure, content, and/or other characteristics of the web page.

Some data may be removed from the digital stream of data. For example, if the key source includes an image, some data such as camera information, location of the image, an owner of the image, and/or certain markers (e.g., 0xFF) may be removed from the digital stream of data. Alternately or additionally, particular types of data may be deleted, such as characters that are not rendered consistently from one email browser to another.

The remainder digital stream of data may be converted to numbers that satisfy a particular key range. For example, each numerical value in the remainder digital stream of data may be converted to a corresponding number within the key range as described below in more detail. In some embodiments, the converted numbers may represent ASCII values that satisfy the key range. The ASCII values may include values in a decimal, hexadecimal, or octal format. In some embodiments, the key range may include a range between 32 and 122 (referred to as a key range [32, 122]), and each of the converted numbers may be no less than 32 and no greater than 122 (e.g., 32≤a number satisfying the key range≤122). The key range may include a minimal range value and a maximal range value. For example, the key range [32, 122] may include a minimal range value of 32 and a maximal range value of 122. Alternatively, the key range may include a different range such as a range between 33 and 122, with a minimal range value of 33 and a maximal range value of 122.

In some embodiments, for each numerical value in the remainder digital stream of data that is less than the minimal range value of the key range (e.g., numerical value<32 when the key range includes [32, 122]), the method 200 may add a first common constant to the corresponding numerical value so that the corresponding numerical value may be converted to a number that satisfies the key range. The first common constant may include 40, 45, 50, or any other suitable integer constant that may convert the corresponding numerical value to the key range. For each numerical value in the remainder digital stream of data that is already within the key range (e.g., 32≤numerical value≤122 when the key range includes [32, 122]), no conversion is needed to perform on the corresponding numerical value. For each numerical value in the remainder digital stream of data that is greater than the maximal range value of the key range and no greater than 255 (e.g., 122<numerical value≤255 when the key range includes [32, 122]), the method 200 may divide the corresponding numerical value by 1.8 to generate a first value (e.g., the first value=the numerical value/1.8), truncate the first value to generate a first integer (e.g., the first integer=a floor or a ceiling of the first value), and subtract a second common constant from the first integer to generate a second integer that satisfies the key range (e.g., the second integer=the first integer−the second common constant). The second common constant may include 20, 30, or another integer constant that makes the second integer fall within the key range. The second common constant may be determined based on the key range and a range of the first integer so that the second integer derived from the first integer may satisfy the key range. For each numerical value in the remainder digital stream of data that is greater than 255 (e.g., numerical value>255), the method 200 may include deleting the corresponding numerical value from the remainder digital stream of data. In these and other embodiments, the conversion of the numerical values in the remainder digital stream of data to a key range may not depend on a size of the unique secret key.

Next, the numbers that satisfy the key range may be converted to corresponding ASCII characters. For example, a number "60" may be converted to a corresponding ASCII character "<." The unique secret key generated from the key source may include the numbers that satisfy the key range or the ASCII characters that correspond to the numbers. In some embodiments, one or more ASCII characters (e.g., punctuation characters) may be removed from the unique secret key.

In some embodiments, one or more unique secret keys may be generated from a single key source. A single unique secret key may be created using a portion of the key source. Alternatively, a single unique secret key may be generated using more than one key source. After generating a unique secret key from a key source, the key source may not be reconstructed from the generated unique secret key since some information in the key source may be lost during the generation of the unique secret key.

In some embodiments, each member (e.g., each client device 111) in the group may store or access a copy of the key source and may separately generate the common secret key from the key source. For example, each member in the group may obtain a common web page from the web server 101 and may separately create a common secret key using the common web page. More generally, if members in the group have agreed upon the same key source(s), the members in the group may separately create matching secret keys from the same key source(s).

For example, a first client device in a group may communicate a source identifier to a second client device in the group. The source identifier may be configured to identify a common key source (e.g., the source identifier may describe "a favorite web page" that each member in the group knows). However, other client devices or users that are not members of the group may not know the meaning of the source identifier (e.g., other client devices that are not members of the group may not know what the "favorite web page" is). The first client device may receive a digital stream of data that describes the common key source based on the source identifier. The first client device may generate a first unique secret key from the common key source. In turn, the second client device may receive the source identifier from the first client device. The second client device may obtain the digital stream of data that describes the common key source based on the received source identifier. The second client device may generate a second unique secret key from the common key source. The second unique secret key may match the first unique secret key. For example, the second unique secret key may be identical to the first unique secret key since they are generated from the same key source.

After safely creating a base set of unique secret keys for a group, members in the group may create additional unique secret keys at a later time and may encrypt the additional unique secret keys using the base set of unique secret keys. As a result, the additional unique secret keys may be safely sent to members in the group, uploaded to a computing device, and/or downloaded from the computing device. For example, the first client device may generate an additional unique secret key from another key source and may encrypt the additional unique secret key using a first unique secret key from the base set of unique secret keys. The first client device may send the encrypted additional unique secret key to the second client device. The second client device may receive data that describes the encrypted additional unique secret key from the first client device. The second client device may decrypt the additional unique secret key from the received data using a copy of the first unique secret key stored on the second client device.

In some embodiments, the client device 111 performing the method 200 may generate the unique secret key from the key source and may share the unique secret key with other members in the group. For example, a user of the client device 111 may transfer the unique secret key to a USB drive (or another storage medium such as memory cards, CDs, DVDs). The USB drive (or another storage medium such as memory cards, CDs, DVDs) may be provided to other users/members of the group to transfer the unique secret key from the USB drive (or another storage medium such as memory cards, CDs, DVDs) to corresponding client devices 111. Each member in the group may track the usage of the unique secret key and may delete the unique secret key from the associated storage medium 115 after one-time use.

At block 206, content to be shared in the group may be encrypted based on the unique secret key using OTP techniques. For example, a size of the unique secret key may be no less than a size of the content, and the unique secret key may only be used once. If the size of the content is less than the size of the unique secret key, a portion of the unique secret key may be used to encrypt the content. However, if the size of the content is greater than the size of the unique secret key, more than one unique secret key may be used to encrypt the content or a new unique secret key of sufficient size may be generated prior to encryption of the content.

In some embodiments, the content may be encrypted by performing one or more of the following operations: (1) converting characters in the content to first ASCII values; (2) converting characters in the unique secret key to second ASCII values, with the size of the unique secret key being equal to or greater than the size of the content; (3) adding the first ASCII values to the second ASCII values to generate intermediate codes, with each intermediate code including a sum of a corresponding first ASCII value and a corresponding second ASCII value; (4) adding a common constant (e.g., 32, or another integer constant greater than or less than 32) to each of the intermediate codes to generate a corresponding encrypted code so that the corresponding encrypted code may have a predetermined number of digits. For example, each encrypted code may include a three-digit code (e.g., 100≤an encrypted code≤999). In some embodiments, the predetermined number of digits for an encrypted code may include an integer between 3 and 6 (e.g., 3≤the predetermined number of digits≤6). In other embodiments, the predetermined number of digits for an encrypted code may be greater than 6. The intermediate codes may have a one-to-one relationship with the encrypted codes. The encrypted content may include the encrypted codes. As a result, each character in the content may be encrypted and represented by a corresponding 3-digit encrypted code.

At block 208, an encrypted message may be sent to other members in the group. The encrypted message may include the encrypted content (e.g., 3-digit encrypted codes) and a message information section. In some embodiments, the message information section may include a source identifier (ID) that identifies the key source. The meaning of the source ID may only be known to members in the group and unknown to other users or client devices not in the group. For example, the message information section may include a source ID "favorite image." Each client device in the group may already store a copy of the favorite image in its associated storage medium for secret key generation, while other client devices not in the group do not know which image is the group's favorite image. Even if the meaning of the message information section is known or deciphered by or at a client device not in the group, encrypted content may still remain secure unless the unique secret key used to encrypt the content is compromised (e.g., unless the unique secret key is obtained by the client device not in the group). The message information section may act as a header section of the encrypted message and may include other information not described herein. In some embodiments, a size of the message information section may include 40 characters or another number of characters. Alternately or additionally, the source ID may identify the unique secret key instead of or in addition to the key source.

In some embodiments, the message information section in the encrypted message may also be encrypted using another unique secret key that members in the group have already known or agreed upon. The other unique secret key used to encrypt the message information section may be generated using an image of a sender. The other unique secret key used to encrypt the message information section may be different from the unique secret key used to encrypt the content. Other members in the group may use the other unique secret key to decrypt the message information section and then use information decrypted from the message information section to determine the unique secret key to use to decrypt the content. Alternatively, the message information section may be unencrypted and sent to other members in the group in plaintext.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may additionally include generating one or more groups of unique secret keys (also referred to as secret key groups) from one or more key sources and storing the one or more secret key groups for later use. Each secret key group may include one or more unique secret keys. In some embodiments, a unique secret key may be selected from a secret key group to encrypt the content. The message information section in the encrypted message may include a group identifier (ID) that identifies the secret key group, a key ID of the unique secret key in the secret key group, a portion ID that identifies at least a portion of the unique secret key used to encrypt the content, and/or any other information related to the encrypted message. In an email communication, the message information section may also include an email address of a sender that sends the encrypted message.

In some embodiments, a user associated with a client device 111 may create a group of users or a group of client devices 111 to send secure content (e.g., secure emails) between members in the group. The group of users may include user IDs (e.g., user email addresses) that identify users in the group. The group of client devices 111 may include device IDs (e.g., IP addresses) that identify client devices 111 in the group. The secure content shared in the group may be encrypted by performing operations similar to those described above with reference to FIG. 2.

Figure 8:
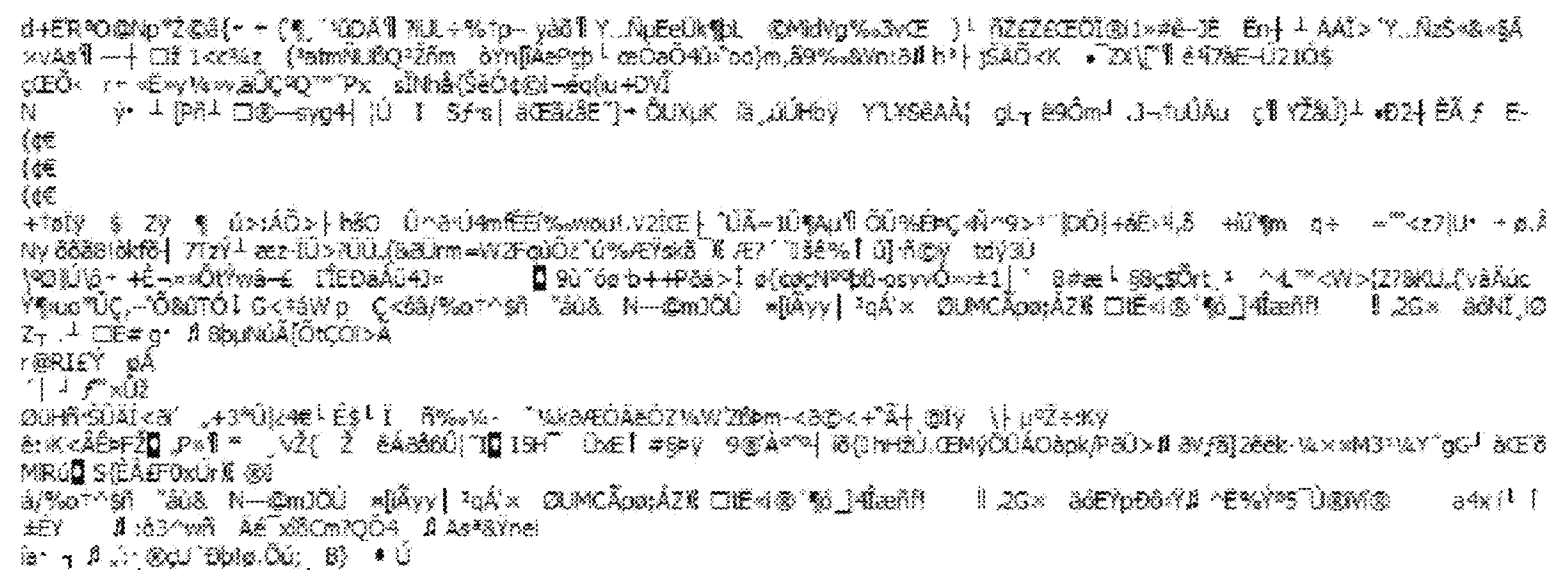

In some embodiments, an image (or, a webpage, a document, a pdf file, etc.) may be represented in its digital form using characters or symbols. Part of the characters for an example image is illustrated in FIG. 8. For example, a portion of the characters used to represent the image in its digital form may include "MGPéñ#2zÅâŏDFi¶>]/" Each of the characters may be converted to a numerical value such as an ASCII numerical value. For example, in ASCII a character "M" may be converted to a numerical value "77," and a character "Å" may be converted to a numerical value "197." A portion of the numerical values converted from the characters, which may represent predictable image information (e.g., a location of a camera), may be discarded. For example, a first ¼ of the numerical values from the image may be discarded. The remaining numerical values may be used to generate one or more secret keys (or OTP keys). For example, each remaining numerical value may be examined as follows.

If the numerical value is in a key range between 65 and 90 or between 97 and 122 (e.g., 65≤the numerical value≤90 or 97≤the numerical value≤122), the numerical value may be added to an OTP key. If the OTP key is in its initial state (e.g., the OTP key is empty), the numerical value becomes the first numerical value in the OTP key. In ASCII the numerical value "65" corresponds to the character "A," the numerical value "90" corresponds to the character "Z," the numerical value "97" corresponds to the character "a," and the numerical value "122" corresponds to the character "z".

If the numerical value is in a range between 123 and 179 (e.g., 123≤the numerical value≤179), the numerical value may be first subtracted by a number (e.g., "57") and then added to the OTP key. If the OTP key is in its initial state (e.g., the OTP key is empty), the numerical value becomes the first numerical value in the OTP key.

If the numerical value is greater than 179 (e.g., the numerical value>179) or in a range between 91 and 96 (e.g., 91≤the numerical value≤97), the numerical value may be discarded.

If the numerical value is less than 65, a number (e.g., "65") may be added to the numerical value to generate a new value. If the new value is in the key range between 65 and 90 or between 97 and 122, the new value may be added to the OTP key.

By performing similar operations to each remaining numerical value from the image, the OTP key with a predetermined length (e.g., a length with 7,500 numerical values) may be generated accordingly. The numerical values in the OTP key may correspond to characters between "A" and "Z" and/or characters between "a" and "z" in ASCII. The OTP key may be transformed from the numerical values to corresponding ASCII characters. Similarly, one or more additional OTP keys may be generated from the same image. Multiple OTP keys (e.g., 8,000 OTP keys) may be generated from multiple images.

Alternatively or additionally, each member in a group may generate a secret key from a common image by performing operations similar to those described above. Each member may use the secret key as a custom key and may create multiple OTP keys from a pre-shared group of secret keys using the custom key and a group name. An example method is described below with reference to FIGS. 6A-6E.

Alternatively or additionally, a member of the group may create a custom key from an image (e.g., a custom key with 20,000 characters) and may then use the custom key and a pseudo-random number (PN) generator to generate multiple OTP keys. The OTP keys may be shared with other members in the group by using a USB or another suitable type of storage medium. For example, the PN generator may be set to generate random numbers between a minimum number (e.g., 1) and a maximum number (e.g., 156). The PN generator may be re-seeded based on a system clock time prior to generating each random number. Each generated random number may be examined as following.

If the random number is less than 32, greater than 90 and less than 97, or greater than 122, the random number may be discarded.

If the random number is between 65 and 90 (e.g., 65≤the random number≤90) or between 97 and 122 (e.g., 97≤the random number≤122), the random number may be converted to a corresponding ASCII character between "A" and "Z" or between "a" and "z." The corresponding ASCII character may be added to a generated OTP key. If the OTP key is in its initial state (e.g., the OTP key is empty), the ASCII character may become the first character in the OTP key.

If the random number is between 32 and 64 (e.g., 32≤the random number≤64), a character retrieval position in the custom key may be determined, and a character of the custom key at the character retrieval position may be retrieved and added to a generated OTP key. If the OTP key is in its initial state (e.g., the OTP key is empty), the character retrieved from the custom key may become the first character in the OTP key.

In some embodiments, before generation of the OTP key, the character retrieval position in the custom key may be initialized to a start position (e.g., the character retrieval position=1, indicating the start point as the beginning of the custom key). Each time a random number between 32 and 64 is generated by the PN generator, the character retrieval position may be updated by a value of the random number (e.g., the updated character retrieval position=the current character retrieval position+the random number). If the updated character retrieval position exceeds a total length of the custom key, the updated character retrieval position may be wrapped around upon reaching the total length of the custom key by using modular arithmetic with a modulo of the total length of the custom key. For example, if the current character retrieval position is 19,998, the random number is 40, and the total length of the custom key is 20,000, the updated character retrieval position is 32(19,998+40 mod 20,000=32). A character from the custom key at the updated character retrieval position "32" may then be retrieved and added to the OTP key.

Among the generated random numbers with values between 1 and 156, about 52 random number values of the 156 random number values may be used and converted to characters in the OTP keys. About 64 random number values of the 156 random number values may be discarded. About 32 random number values of the 156 random number values may be used to randomly select characters from the custom key.

By repeating similar operations described above, the OTP key with a predetermined length (e.g., a length with 7,500 characters) may be generated accordingly. Similarly, one or more additional OTP keys may be generated using the custom key and the PN generator. The character retrieval position of the custom key accumulated at a previous OTP key generation may pass down to a next OTP key generation as a start point of the custom key in the next OTP key generation. A total number of 3,000 OTP keys may be generated. These OTP keys may be shared with other members in a group by using a USB, a CDROM disk, or another suitable type of storage medium.

Some embodiments disclosed herein include an article of manufacture such as a non-transitory computer storage medium having instructions stored thereon that are executable by a computing device to perform operations included in the method 200 of FIG. 2, such as the operations illustrated by blocks 202, 204, 206, and/or 208 in FIG. 2, and/or variations thereof. The non-transitory computer storage medium may be included in or may be accessible to one or more of the client devices 111a, 111b . . . 111n of FIG. 1. The computing device may include any of the client devices 111a, 111b . . . 111n and/or a processor or other processing device of the client devices 111a, 111b . . . 111n such as the processor 113.

Figure 3:
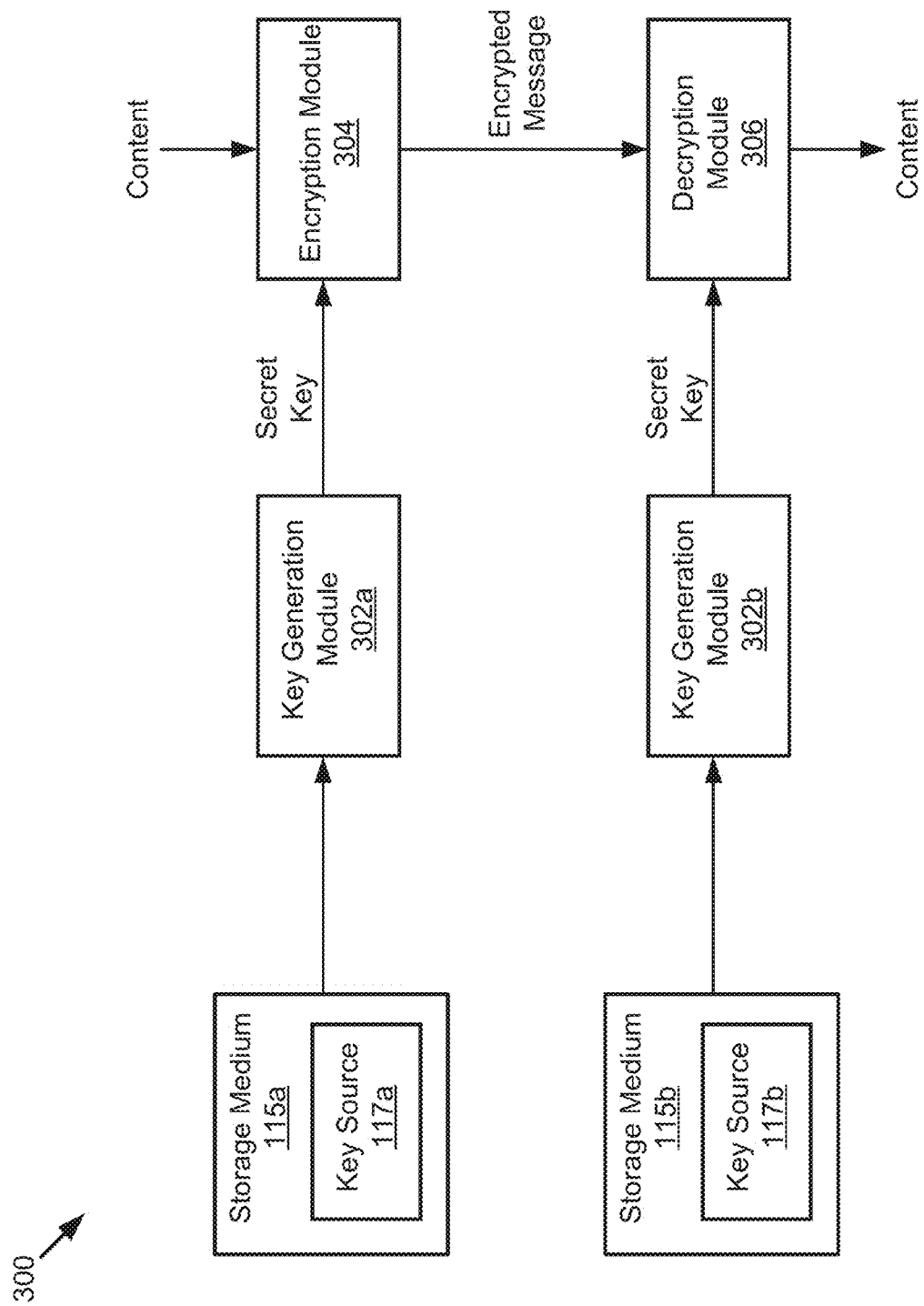
FIG. 3 is a block diagram of an example encryption and decryption process.

FIG. 3 is a block diagram of an example encryption and decryption process 300, arranged in accordance with at least some embodiments described herein. In the example encryption and decryption process 300, it is assumed that the client device 111a encrypts content and sends the encrypted content to the client device 111b. During encryption of the content, a key generation module 302a on the client device 111a may receive a key source 117a from an associated storage medium 115a (and/or directly from the web server 101 of FIG. 1 or another source) and may generate a unique secret key from the key source 117a. The unique secret kay may include an OTP key. Alternately or additionally, the unique secret key may be stored on the storage medium 115a and available for use without the key generation module 302a first generating the unique secret key. An encryption module 304 on the client device 111a may encrypt the content based on the unique secret key using OTP techniques. The encryption module 304 may generate an encrypted message that includes the encrypted content and may send the encrypted message to the client device 111b. The encrypted message may additionally include a message information section that includes a source ID that identifies the key source 117a and/or the unique secret key, as already described above.

In some embodiments, an encryption process to encrypt the content may include one or more of the following operations: (1) converting characters in the content to first ASCII numerical values; (2) converting characters in the unique secret key to second ASCII numerical values; (3) adding the first ASCII numerical values to the second ASCII numerical values to generate corresponding intermediate codes; and (4) adding a common numerical constant to each of the intermediate codes to generate a corresponding encrypted code so that all the encrypted codes may include a predetermined number of digits. For example, each encrypted code may have four digits. In another example, each encrypted code may have six digits. The encrypted content may include the encrypted codes.

A decryption module 306 on the client device 111b may receive the encrypted message from the client device 111a. A key generation module 302b on the client device 111b may use the source ID to obtain a key source 117b from an associated storage medium 115b. The key source 117b may be identical to the key source 117a and may have a common source ID as the key source 117a. The key generation module 302b may generate the same unique secret key from the key source 117b. Alternately or additionally, the same unique secret key may be stored on the storage medium 115b and available for use without the key generation module 302b first generating the same unique secret key.

The decryption module 306 may decrypt the content from the encrypted message using the unique secret key. For example, a decryption process to decrypt the content from the encrypted message may include one or more of: (1) extracting 3-digit encrypted codes from the encrypted message; (2) subtracting a common numerical constant from each of the encrypted codes to generate corresponding intermediate codes, the common numerical constant being the same numerical constant as the one added to intermediate codes during the encryption process; (3) converting characters in the unique secret key to first ASCII numerical values; (4) subtracting first ASCII numerical values from the corresponding intermediate codes to obtain second ASCII numerical values; and (5) converting the second ASCII numerical values to characters. The decrypted content may include the characters converted from the second ASCII numerical values. The decryption process may generally include a reverse process of the encryption process.

Alternately or additionally, common secret key groups may be stored in the storage mediums 115a and 115b, respectively. The encryption module 304 may select a unique secret key from one of the secret key groups and may use the selected unique secret key to encrypt the content. The message information section in the encrypted message may include a group ID that identifies a secret key group associated with the unique secret key, a key ID that identifies the unique secret key in the secret key group, and/or a portion ID that identifies at least a portion of the unique secret key used to encrypt the content. During the decryption process, the decryption module 306 may obtain the unique secret key from the storage medium 115b using the group ID, the key ID, and/or the portion ID and may decrypt the content using the unique secret key obtained from the storage medium 115b.

In these and other embodiments, the encryption module 304 and the decryption module 306 may use OTP techniques, data encryption standard (DES), triple DES, and any other encryption/decryption methods to encrypt and decrypt the content.

In some embodiments, the content communicated between the client device 111a and the client device 111b may include text-based content including, but not limited to, an email, a text message, a file, an SSL communication, and other suitable text content. The text-based content may be encrypted at the client device 111a using an OTP key and decrypted at the client device 111b using the same OTP key. If the text-based content includes an email, a subject line of the email may be processed before encrypting the body of the email. An SSL communication may or may not include a subject line. The SSL communication may be processed similar to an email. Each encrypted code for the SSL communication may include more digits than encrypted codes for an email. For example, the SSL communication may have a wider range of characters to transmit than an email, and therefore encrypted codes for the SSL communication may include 5 digits while encrypted codes for the email may include 3 digits.

Alternatively or additionally, the content communicated between the client device 111a and the client device 111b may include audio-based content including, but not limited to, a voice memo file, a phone call conversation (e.g., a landline phone call or a cellular phone call), and other suitable types of audio files or data. The client device 111a may convert an audio signal that represents the audio-based content into a digital signal, and may encrypt the digital signal using an OTP key. For example, the client device 111a may encrypt the digital signal using the OTP key to generate intermediate codes, which may be converted to encrypted codes with a predetermined number of digits. The client device 111a may send the encrypted codes along with a parameter for selecting the OTP key to the client device 111b. The client device 111b may determine the OTP key used to encrypt the digital signal based on the received parameter. The client device 111b may obtain the intermediate codes from the received encrypted codes, decrypt the digital signal from the intermediate codes using the OTP key, and convert the digital signal into an audio signal. Similarly, the client device 111b may also transmit other audio-based content to the client device 111a simultaneously using other OTP keys.

Figure 4B:
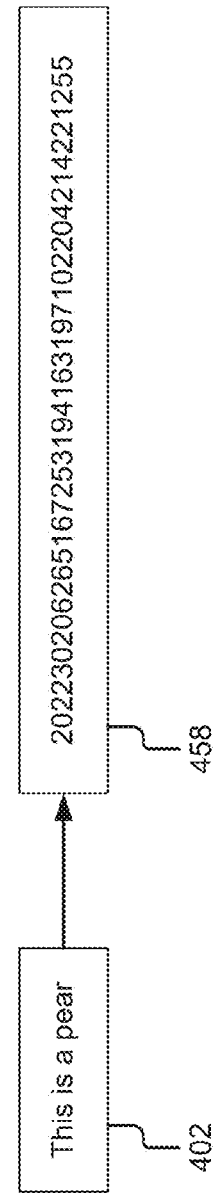

FIGS. 4A and 4B include graphic representations 400 and 450 that illustrate aspects of an example embodiment of the method 200 of FIG. 2, arranged in accordance with at least some embodiments described herein. Referring to FIG. 4A, content to be encrypted may include text 402 "This is a pear." FIG. 4A illustrates text characters 404 in the text 402 and corresponding text character values 406. The text character values 406 include ASCII numerical values for the text characters 404. A unique secret key 408 used to encrypt the text 402 includes "V^Evgt/cD&<Q\m." FIG. 4A also illustrates key characters 410 in the unique secret key 408 and corresponding key character values 412. The key character values 412 include ASCII numerical values for the key characters 410.

Referring to FIG. 4B, the piece of text 402 in FIG. 4A is encrypted using the unique secret key 408. In general, the text character values 406 may be added to the key character values 412 to generate intermediate codes 452 and a common numerical constant 454 is added thereto to generate encrypted codes 456. More particularly, in the illustrated embodiment, each of the text character values 406 is added to a corresponding one of the key character values 412 to generate a corresponding one of the intermediate codes 452. The common constant 454 (e.g., 32) is added to each of the intermediate codes 452 to generate a corresponding one of the encrypted codes 456 so that each encrypted code 456 may include a 3-digit code. Alternatively, another suitable common constant may be added to each of the intermediate codes 452 to generate a corresponding encrypted code that may include a predetermined number of digits. As a result, an encrypted message 458 that includes the encrypted codes 456 may be generated for the text 402.

Figure 5:
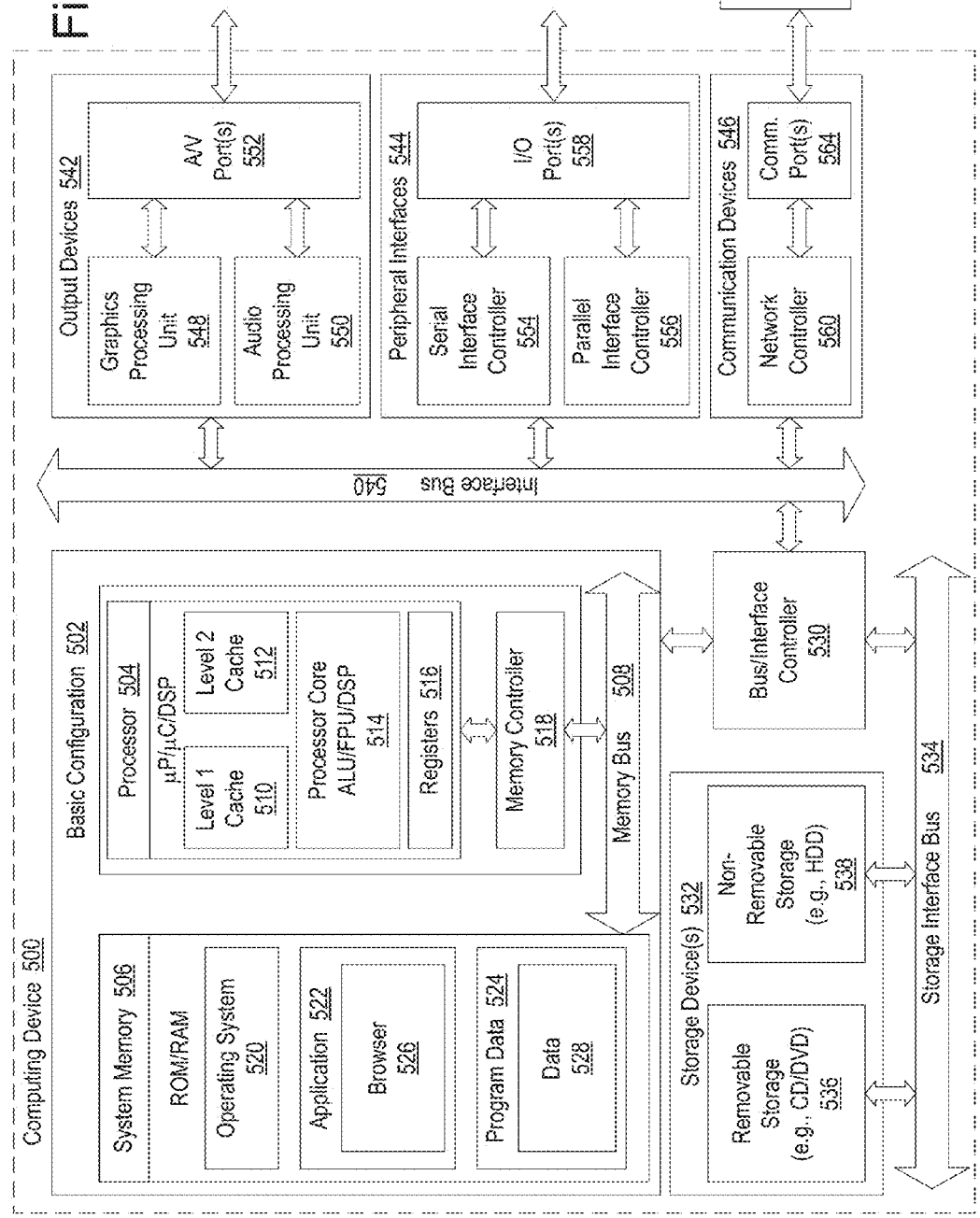
FIG. 5 is a block diagram that illustrates an example computing device that is arranged for sharing secure content in a group.

FIG. 5 is a block diagram that illustrates an example computing device 500 that is arranged for sharing secure content in a group, in accordance with at least some embodiments described herein. The computing device 500 may be included in or correspond to any of the client devices 111a, 111b . . . 111n, and/or the web server 101 of FIG. 1, for example. In a very basic configuration 502, the computing device 500 may typically include one or more processors 504 and a system memory 506. A memory bus 508 may be used for communicating between the processor 504 and the system memory 506.

Depending on the desired configuration, the processor 504 may be of any type including, but not limited to, a CPU, a µP, a µC, a DSP, or any combination thereof. The processor 504 may include one or more levels of caching, such as a level one cache 510 and a level two cache 512, a processor core 514, and registers 516. The example processor core 514 may include an arithmetic logic unit (ALU), a floating point unit (FPU), a digital signal processing core (DSP core), or any combination thereof. An example memory controller 518 may also be used with the processor 504, or in some implementations the memory controller 518 may be an internal part of the processor 504.

Depending on the desired configuration, the system memory 506 may be of any type including, but not limited to, volatile memory (such as RAM), non-volatile memory (such as ROM, flash memory), or any combination thereof. The system memory 506 may include an operating system (OS) 520, one or more applications 522, and program data 524. The application 522 may include a browser 526, an app, an application server, or other application that may be arranged to perform one or more of the functions as described herein including those described with respect to the method 200 of FIG. 2. The program data 524 may include data 528 such as content to be shared, unique secret keys, and/or key sources. In some embodiments, the application 522 may be arranged to operate with the program data 524 on the OS 520 such that implementations of methods for sharing secure content in a group, such as the method 200 of FIG. 2, may be provided as described herein.

The computing device 500 may have additional features or functionality, and additional interfaces to facilitate communications between the basic configuration 502 and any required devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 506, removable storage devices 536, and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device) or other peripheral devices (e.g., printer, scanner) via one or more I/O ports 558. The example communication device 546 may include a network controller 560, which may be arranged to facilitate communications with one or more other computing devices 562 over a network communication link via one or more communication ports 564.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 500 may also be implemented as a personal computer including both laptop computer and non-laptop computer configurations.

FIGS. 6A-6E shows a flow diagram of an example method 600 to create OTP keys, arranged in accordance with at least some embodiments described herein. The method 600 may be performed in whole or in part by, e.g., any of the client devices 111*a*, 111*b* . . . 111*n* of FIG. 1. Although illustrated as discrete blocks, various blocks may be divided into additional blocks, combined into fewer blocks, or eliminated, depending on the desired implementation.

Figure 6A:
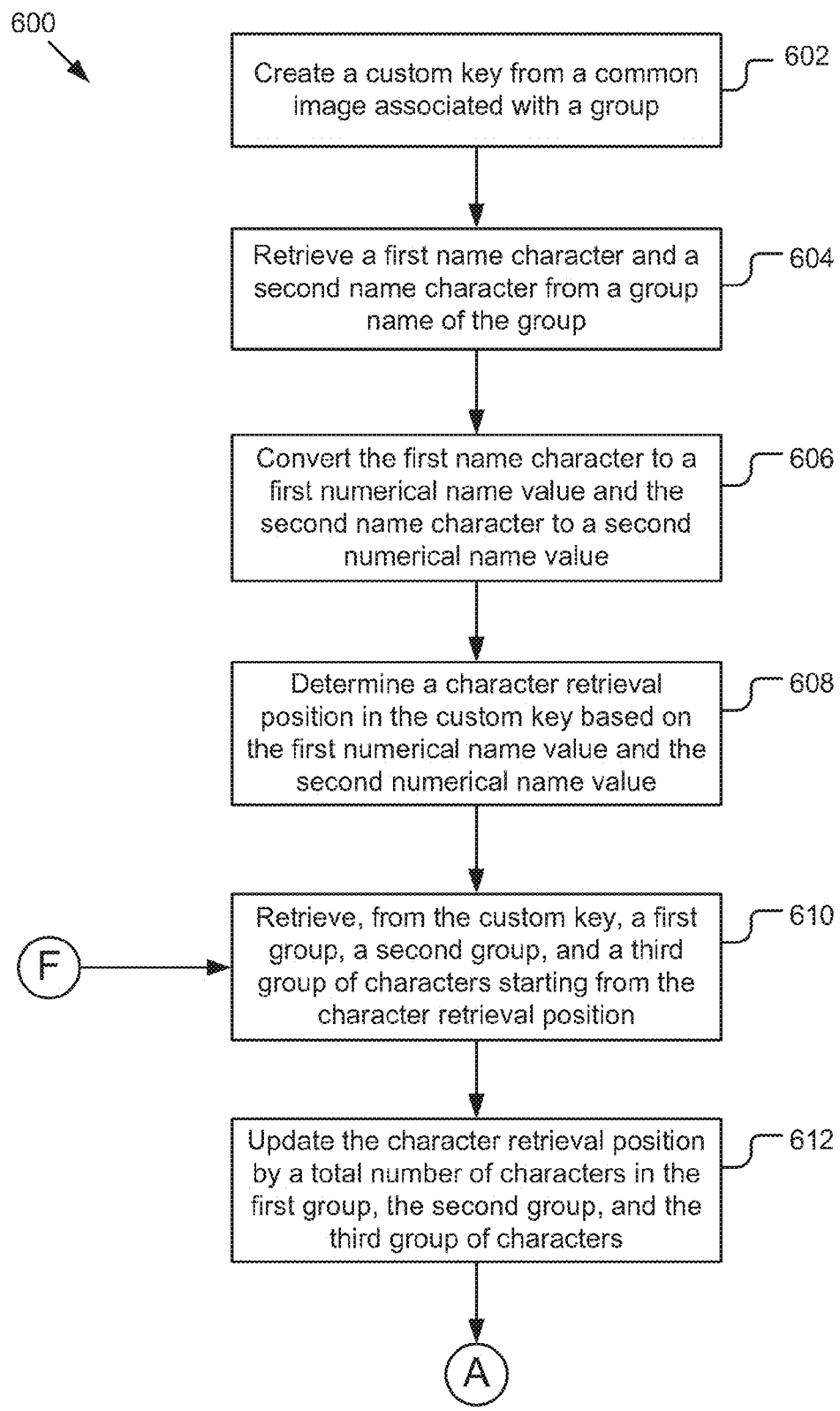
FIGS. 6A-6E show a flow diagram of an example method to create OTP keys.

Referring to FIG. 6A, the method 600 may begin at block 602 in which a custom key may be created from a common image associated with a group. Each member in the group may use the common image to generate the same custom key.

At block 604, a first name character and a second name character from a group name of the group may be retrieved. The first name character and the second name character may be any two characters in the group name.

At block 606, the first name character may be converted to a first numerical name value, and the second name character may be converted to a second numerical name value. For example, the first name character and the second name character may be converted to corresponding ASCII numerical values.

At block 608, a character retrieval position in the custom key may be determined based on the first numerical name value and the second numerical name value. The first numerical name value may determine a relative position value in the custom key to start retrieving characters from the custom key. The second numerical name value may determine whether the character retrieval position in the custom key is relative to a beginning of the custom key or an end of the custom key. For example, if the second numerical name value is an even number or less than a predetermined number (e.g., 91), the character retrieval position in the custom key may include a position that counts from the beginning of the custom key by the relative position value determined by the first numerical name value. If the second numerical name value is an odd number or no less than the predetermined number (e.g., 91), the character retrieval position in the custom key may include a position that counts from the end towards the beginning of the custom key by the relative position value.

For example, if the first name character is "i" that corresponds to the first numerical name value of "105," and the second name character is "r" that corresponds to the second numerical name value of "114" (an even number), the character retrieval position in the custom key may be the $105^{th}$ character position counting from the beginning of the custom key. If the second name character is "s" that corresponds to the second numerical name value of "115" (an odd number), the character retrieval position in the custom key may be the $105^{th}$ character position counting from the end towards the beginning of the custom key.

At block 610, a first group, a second group, and a third group of characters may be retrieved from the custom key starting from the character retrieval position. For example, the first group of characters may include a predetermined number of consecutive characters (e.g., 3 consecutive characters) starting from the character retrieval position. The second group of characters may include the predetermined number of consecutive characters (e.g., 3 consecutive characters) located next to the consecutive characters of the first group. The third group of characters may include the predetermined number of consecutive characters (e.g., 3 consecutive characters) located next to the consecutive characters of the second group.

At block 612, the character retrieval position may be updated by a total number of characters in the first group, the second group, and the third group of characters. For example, (the updated character retrieval position)=(the current character retrieval position)+(the total number of characters in the first group, the second group, and the third group) mod (a total length of the custom key).

Figure 6B:
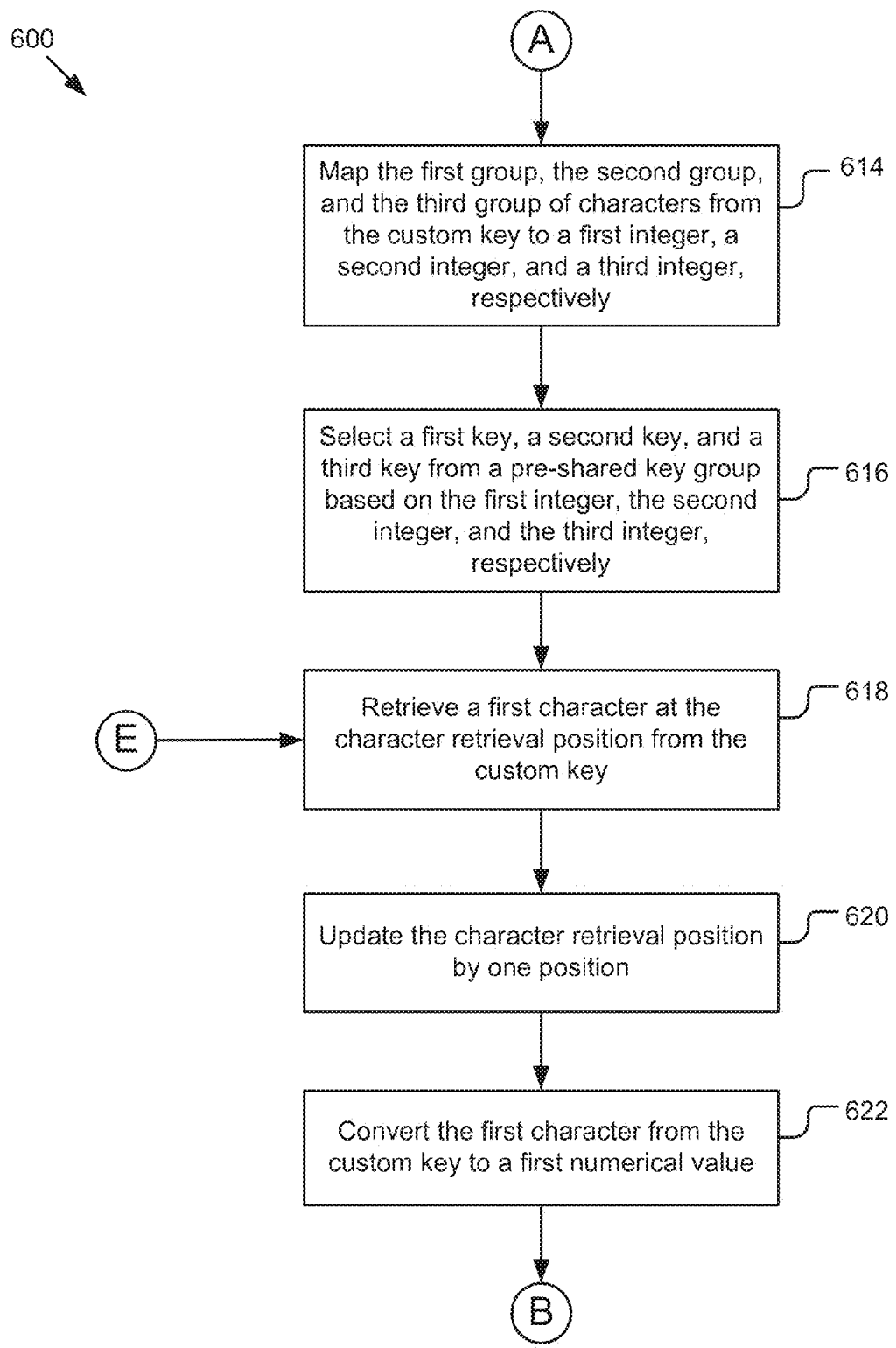

Referring to FIG. 6B, at block 614, the first group, the second group, and the third group of characters from the custom key may be mapped to a first integer, a second integer, and a third integer, respectively. The first integer, the second integer, and the third integer may have values between 1 and a total number of keys in a pre-shared key group (e.g., 8,000), respectively.

At block 616, a first key, a second key, and a third key may be selected from the pre-shared key group based on the first integer, the second integer, and the third integer, respectively. For example, if the first integer, the second integer, and the third integer are 10, 278, and 3456, the $10^{th}$, $278^{th}$, and $3456^{th}$ keys in the pre-shared key group may be selected as the first key, the second key, and the third key, respectively.

At block 618, a first character at the character retrieval position may be retrieved from the custom key.

At block 620, the character retrieval position may be updated by one position. For example, (the updated character retrieval position)=(the current character retrieval position)+1 mod (the total length of the custom key).

At block 622, the first character from the custom key may be converted to a first numerical value. For example, the first character may be converted to an ASCII numerical value.

Figure 6C:
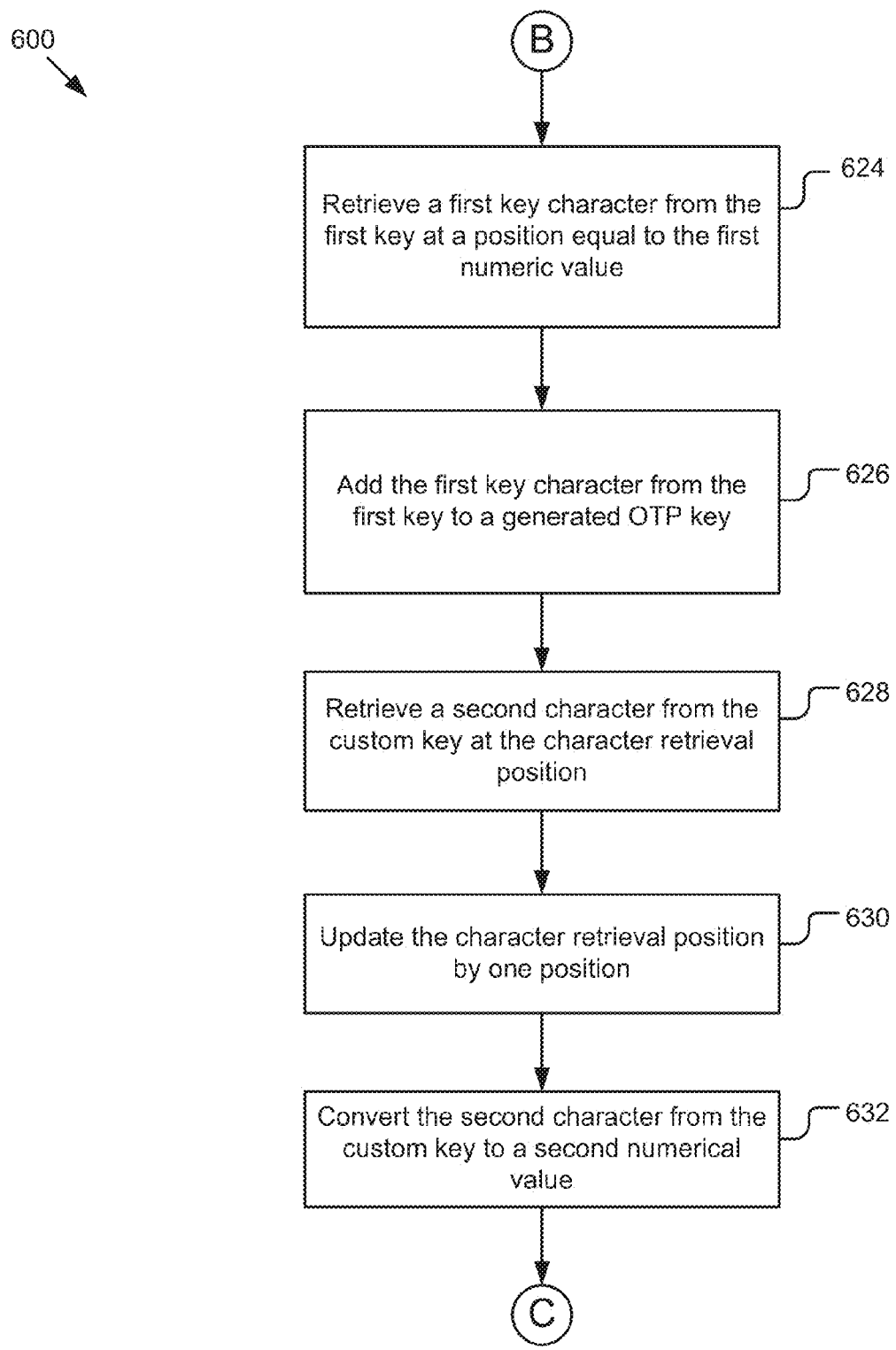

Referring to FIG. 6C, at block 624, a first key character from the first key may be retrieved from the first key at a position equal to the first numerical value.

At block 626, the first key character from the first key may be added to a generated OTP key. If the generated OTP key is in its initial state (e.g., the OTP key is empty), the first key character from the first key may become the first character in the OTP key.

At block 628, a second character is retrieved from the custom key at the character retrieval position.

At block 630, the character retrieval position may be updated by one position.

At block 632, the second character from the custom key may be converted to a second numerical value. For example, the second character from the custom key may be converted to a corresponding ASCII numerical value.

Figure 6D:
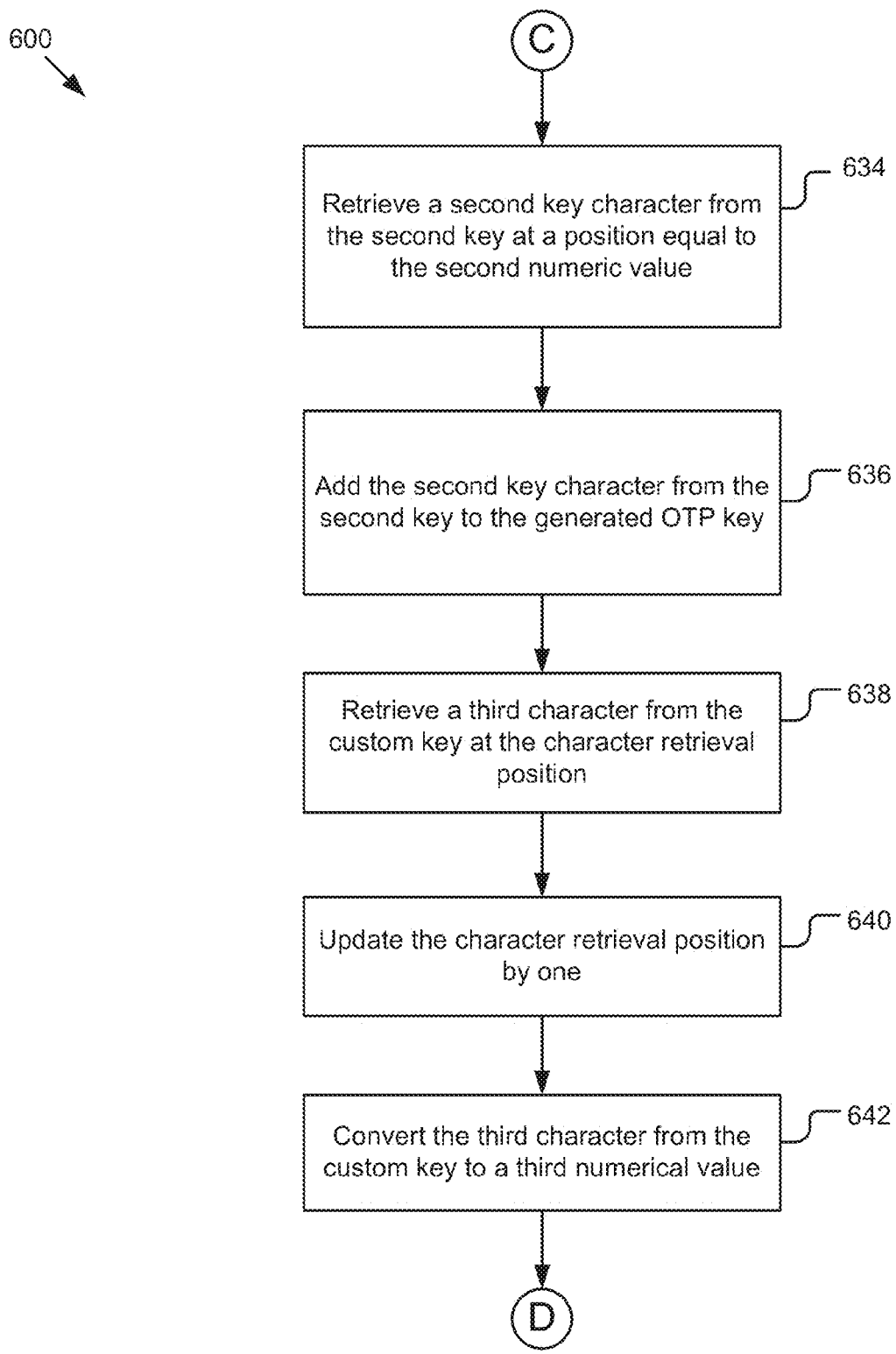

Referring to FIG. 6D, at block 634, a second key character from the second key may be retrieved from the second key at a position equal to the second numerical value.

At block 636, the second key character from the second key may be added to the generated OTP key.

At block 638, a third character may be retrieved from the custom key at the character retrieval position.

At block 640, the character retrieval position may be updated by one position.

At block 642, the third character from the custom key may be converted to a third numerical value. For example, the third character from the custom key may be converted to a corresponding ASCII numerical value.

Figure 6E:
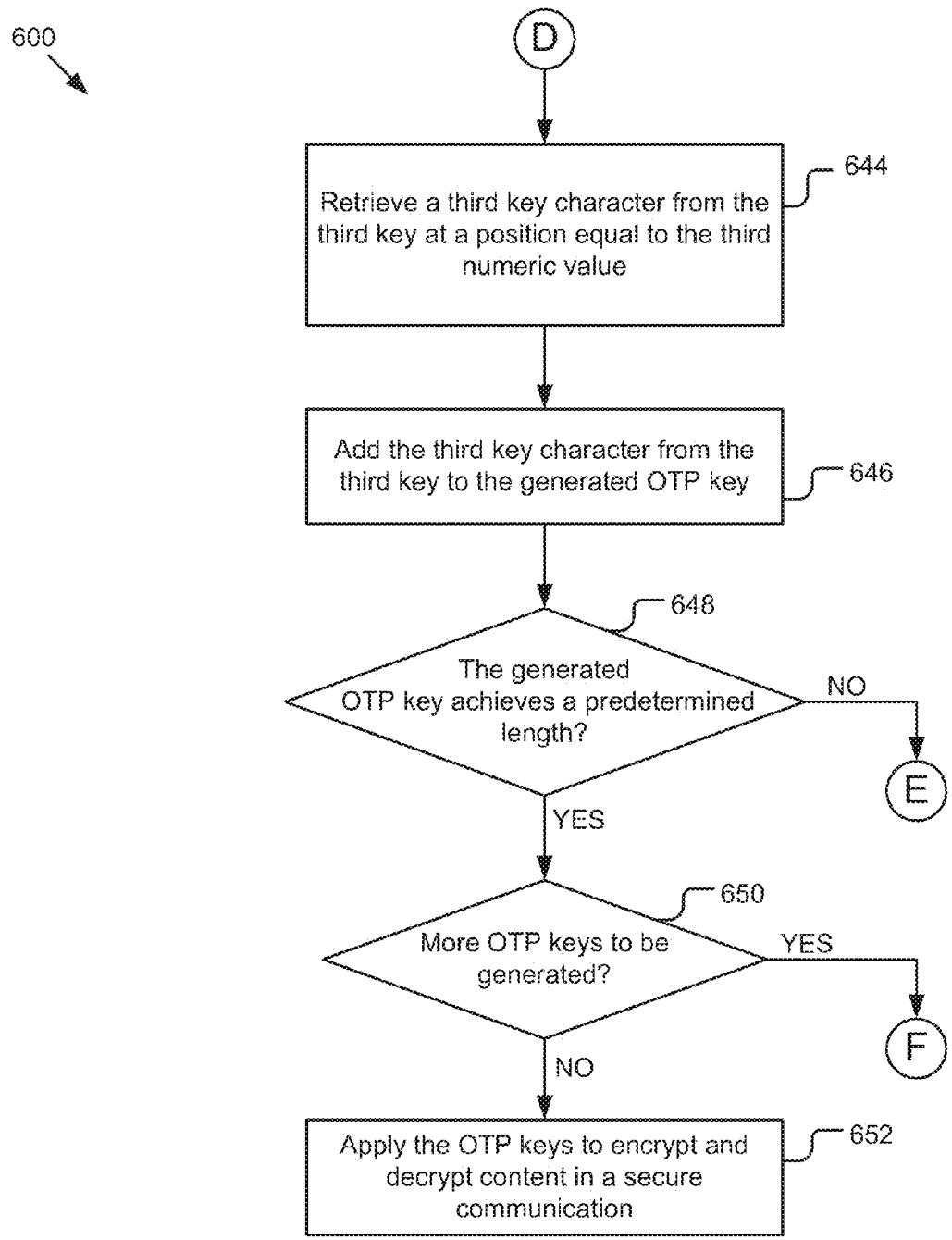

Referring to FIG. 6E, at block 644, a third key character from the third key may be retrieved from the third key at a position equal to the third numerical value.

At block 646, the third key character from the third key may be added to the generated OTP key.

At block 648, the method 600 may include determining whether the generated OTP key has achieved a predetermined length. If the generated OTP key has achieved the predetermined length, the method 600 may proceed to block 650. Otherwise, the method 600 may return to block 618 of FIG. 6B. For example, the method 600 may continue retrieving key characters from the first key, the second key, and the third key by performing operations similar to blocks 618-648 until the generated OTP key reaches the predetermined length.

At block 650, the method 600 may include determining whether there are more OTP keys to be generated. If there is at least one additional OTP key to be generated, the method 600 may return to block 610 of FIG. 6A. For example, the method 600 may continue generating additional OTP keys by performing operations similar to blocks 610-650 until a predetermined number of OTP keys (e.g., 500 OTP keys) have been created. If the number of generated OTP keys reaches the predetermined number of OTP keys, the method 600 may proceed to block 652.

At block 652, the OTP keys may be applied to encrypt and/or decrypt content in a secure communication.

Although the method 600 is described above to generate OTP keys from three keys selected from the pre-shared key group, the method 600 may be implemented to generate the OTP keys from multiple keys selected from the pre-shared key group. For example, at block 610 of FIG. 6A, multiple groups of characters may be retrieved from the custom key at a position starting from the character retrieval position. At block 612 of FIG. 6A, the character retrieval position may be updated by a total number of characters in the multiple groups of characters. At blocks 614 and 616 of FIG. 6B, the multiple groups of characters may be mapped to multiple integers which may be used to select multiple keys from the pre-shared key group. Next, by performing operations similar to blocks 618-646, multiple key characters may be retrieved from the multiple keys and added to a generated OTP key, respectively.

In general, the method 600 may include: creating a custom key from an image, a document, or another key source; retrieving a first name character and a second name character from a group name; determining a character retrieval position in the custom key based on the first name character and the second name character; retrieving multiple groups of characters from the custom key from a position starting from the character retrieval position; updating the character retrieval position by a total number of characters in the multiple groups of characters; converting the multiple groups of characters to multiple integers; selecting multiple keys from the pre-shared key group based on the multiple integers; retrieving key characters from the multiple keys based on the custom key; and adding the key characters from the multiple keys to the OTP key.

Some embodiments disclosed herein include an article of manufacture such as a non-transitory computer storage medium having instructions stored thereon that are executable by a computing device to perform operations included in the method 600 of FIGS. 6A-6E, such as the operations illustrated by blocks 602, 604, 606, 608, 610, 612, 614, 616, 618, 620, 622, 624, 626, 628, 630, 632, 634, 636, 638, 640, 642, 644, 646, 648, 650, and/or 652 in FIGS. 6A-6E, and/or variations thereof. The non-transitory computer storage medium may be included in or may be accessible to one or more of the client devices 111a, 111b . . . 111n of FIG. 1. The computing device may include any of the client devices 111a, 111b . . . 111n and/or a processor or other processing device of the client devices 111a, 111b . . . 111n such as the processor 113.

Figure 7B:
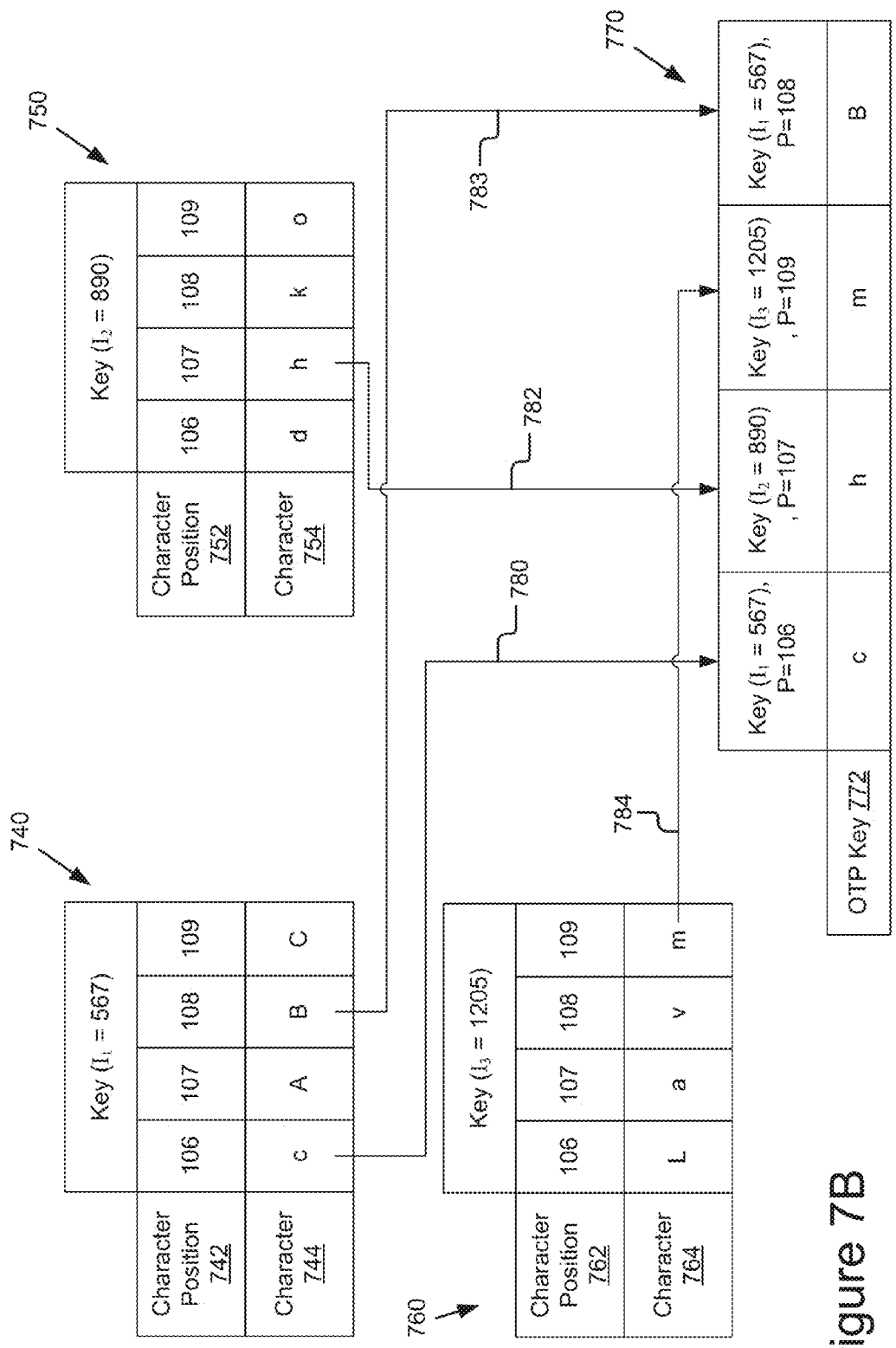

FIGS. 7A and 7B include graphic representations that illustrate aspects of an example embodiment of the method 600 of FIGS. 6A-6E, arranged in accordance with at least some embodiments described herein. FIG. 7A illustrates a table 702 that lists a group name 704 with name characters 706 "friends" and corresponding numerical name values 708 for the name characters 706. FIG. 7A also illustrates a table 722 that lists a custom key 724. The table 722 shows character positions 726 (e.g., from the $104^{th}$ position to the $117^{th}$ position) in the custom key 724, corresponding characters 728 in the character positions 726, and corresponding numerical values 730 for the characters 728.

To generate an OTP key, the custom key 724 may be generated from an image shared in a group with the name group 704 "friends." A first name character "r" may be selected from the group name 704 and converted to a numerical name value "114," which is an even number and determines that the character retrieval position in the custom key 724 is relative to a beginning of the custom key 724. A second name character "i" may be selected from the group name 704 and converted to a numerical name value "105," which determines a relative retrieval position in the custom key 724 to start retrieving characters to be 105. Thus, the character retrieval position in the custom key 724 is the $105^{th}$ character position counting from the beginning of the custom key 724, illustrated by an arrow 710.

A first group of characters from the $105^{th}$ character position to the 105 character position in the custom key 724 may be retrieved from the custom key 724 and converted to an integer $I_1=567$. The integer $I_1=567$ may be used to retrieve the $567^{th}$ key from a pre-shared key group as a first key to generate the OTP. A second group of characters from the $108^{th}$ character position to the $110^{th}$ character position in the custom key 724 may be retrieved from the custom key 724 and converted to an integer $I_2=890$. The integer $I_2=890$ may be used to retrieve the $890^{th}$ key from the pre-shared key group as a second key to generate the OTP. A third group of characters from the $111^{th}$ character position to the $113^{th}$ character position in the custom key 724 may be retrieved from the custom key 724 and converted to an integer $I_3=1205$. The integer $I_3=1205$ may be used to retrieve the $1205^{th}$ key from the pre-shared key group as a third key to generate the OTP. Next, the character retrieval position may be updated to be the $114^{th}$ character position (e.g., $114=105+3\times3$).

Referring to FIG. 7B, a table 740 lists part of the first key ($I_1=567$). The table 740 lists character positions 742 from the $106^{th}$ character position to the $109^{th}$ character position and corresponding characters 744 in the first key. A table 750 lists part of the second key ($I_2=890$). The table 750 lists character positions 752 from the $106^{th}$ character position to the $109^{th}$ character position and corresponding characters 754 in the second key. A table 760 lists part of the third key ($I_3=1205$). The table 760 lists character positions 762 from the $106^{th}$ character position to the $109^{th}$ character position and corresponding characters 764 in the third key.

From the above discussion with reference to FIG. 7A, the character retrieval position in the custom key 724 is updated to be the $114^{th}$ position, which includes a character "b" with a corresponding numerical value "106." Thus, referring to FIG. 7B, a key character from the first key ($I_1=567$) at the $106^{th}$ position (P=106), which is a character "c," is retrieved and added to an OTP key 772 in a table 770, as illustrated by an arrow 780.

Next, referring back to FIG. 7A, the character retrieval position is updated by one position to be the $115^{th}$ position in the custom key 724, which includes a character "c" with a corresponding numerical value "107." Thus, referring again to FIG. 7B, a key character from the second key ($I_2=890$) at the $107^{th}$ position (P=107), which is a character "h," is retrieved and added to the OTP key 772, as illustrated by an arrow 782.

Next, referring back to FIG. 7A, the character retrieval position is updated by one position to be the $116^{th}$ position in the custom key 724, which includes a character "e" with a corresponding numerical value "109." Thus, referring again to FIG. 7B, a key character from the third key ($I_3=1205$) at the $109^{th}$ position (P=109), which is a character "m," is retrieved and added to the OTP key 772, as illustrated by an arrow 784.

Next, referring back to FIG. 7A, the character retrieval position is updated by one position to be the $117^{th}$ position in the custom key 724, which includes a character "d" with a corresponding numerical value "108." Thus, referring again to FIG. 7B, a key character from the first key ($I_1=567$) at the $108^{th}$ position (P=108), which is a character "B," is retrieved and added to the OTP key 772, as illustrated by an arrow 783. By performing similar operations, the OTP key 772 with a predetermined key length can be generated from the first key, the second key, and the third key, by using the custom key as a map for mapping key characters from the first key, the second key, and the third key to the OTP key 772.

FIG. 8 includes a graphic representation that illustrates part of an example image represented in its digital form.

Figure 9:
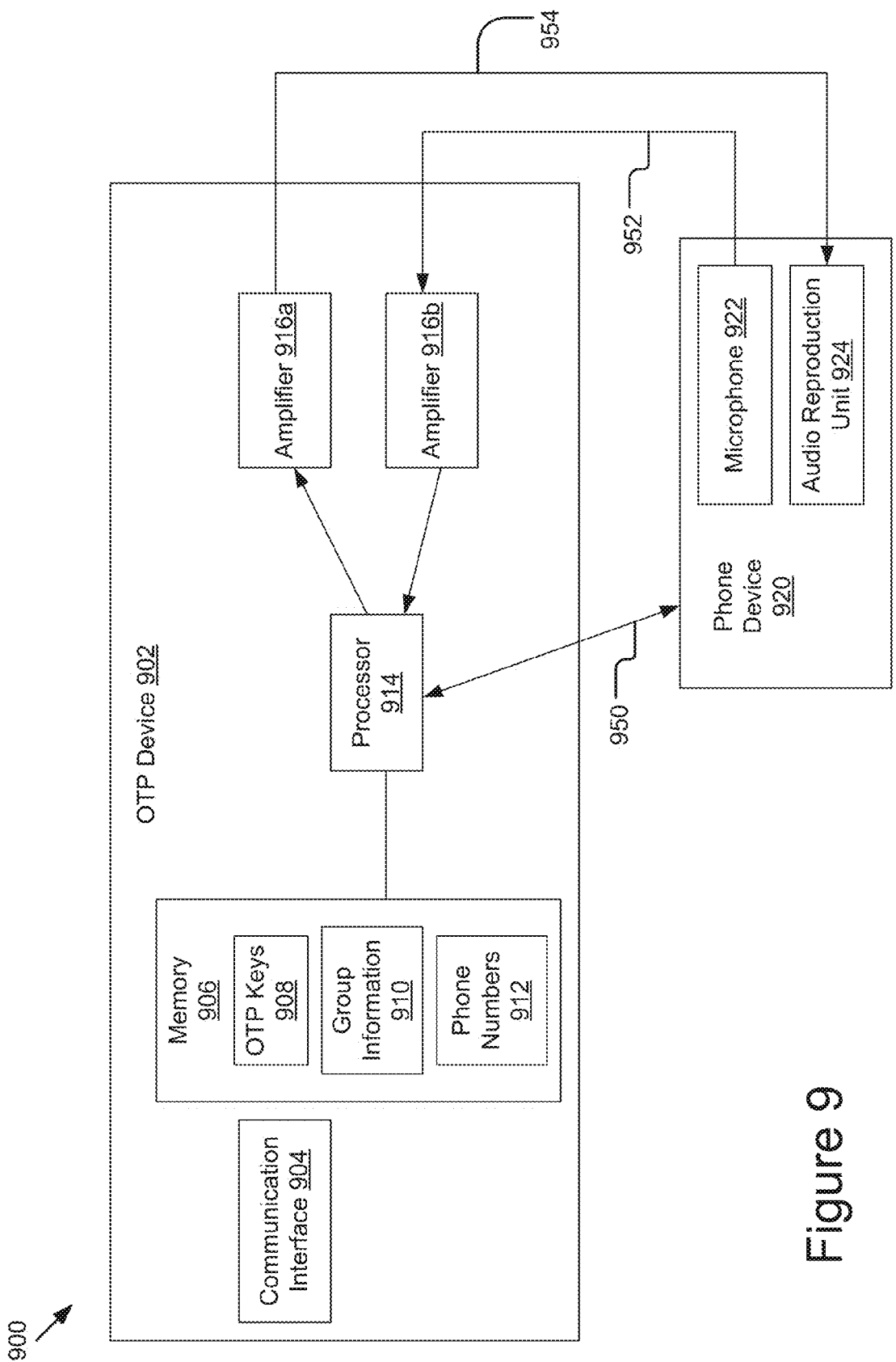
FIG. 9 is a block diagram of an example system configured to encrypt and/or decrypt phone call conversations.

FIG. 9 is a block diagram of an example system 900 configured to encrypt and/or decrypt phone call conversations, arranged in accordance with at least some embodiments described herein. The system 900 may include a phone device 920 and an OTP device 902. The OTP device 902 may be connected to the phone device 920 via a microphone/earphone jack, a Bluetooth connection, or another suitable type of connections. Although FIG. 9 illustrates various components of the OTP device 902 are connected to various components of the phone device 920 via signal lines 950, 952, and 954, in some embodiments the OTP device 902 may be connected to the phone device 920 via a single connection (e.g., a connection using a microphone/earphone jack, a near field connection (NFC), or a Bluetooth connection) or via multiple different connections.

The phone device 920 may include a cell phone, a landline phone, a satellite phone, a soft phone, or another suitable type of phones. The phone device 920 may include a microphone 922 and an audio reproduction device 924. The microphone 922 may be configured to capture voice signals and/or other audio signals. The audio reproduction device 924 may include an earphone, a speaker, or another suitable audio reproduction device. The audio reproduction device 924 may be configured to play voice signals and/or other audio signals to a user.

The OTP device 902 may be configured to use OTP techniques to encrypt and/or decrypt phone call conversations between the phone device 920 and another phone device that may be similar or identical to the phone device 920. The OTP device 902 may include a communication interface 904, a memory 906, a processor 914, amplifiers 916a and 916b, and other suitable components. In some embodiments, the OTP device 902 may include a microphone for capturing audio signals.

The communication interface 904 may be configured to synchronize the OTP device 902 with a secure communication application (e.g., a Kaspersky endpoint security (KES) program) installed on a computer. The communication interface 904 may include a USB interface, a Wi-Fi interface, a thunderbolt interface, or another suitable type of input/output interfaces.

The memory 906 may store OTP keys 908, group information 910 associated with a user, phone numbers 912, and other suitable information. The memory 906 may include a RAM or another suitable type of storage medium. In some embodiments, the OTP keys 908, group information 910, and phone numbers 912 may be downloaded to the OTP device 902 via the USB interface 904.

The processor 914 may be similar or identical to the processor 113 of FIG. 1. In some embodiments, the phone device 920 may initiate a phone call with another phone device. The microphone 922 or a microphone on the OTP device 902 may capture discrete-time multi-frequency (DTMF) tones from the phone number dialing on the phone device 920, and may send the DTMF tones to the digital amplifier 916*b*. The digital amplifier 916*b* may amplify the DTMF tones. The processor 914 may identify a phone number dialed in the phone device 920 from the DTMF tones, and may select a first OTP key from the OTP keys 908 using the phone number.

Next, the microphone 922 may capture a voice signal of a user and may send the voice signal to the amplifier 916*b* for amplification. The processor 914 may convert the voice signal to a first digital signal and may encrypt the first digital signal using the first OTP key. The encrypted digital signal as well as a first OTP PIN number may form an outbound signal that may be sent to the phone device 920. The phone device 920 may then transmit the outbound signal to another phone device that participates in the phone call. The first OTP PIN number may be used by the other phone device to identify and/or create the first OTP key.

Meanwhile, if the phone device 920 receives an inbound signal from the other phone device, the phone device 920 may forward the inbound signal to the processor 914 for decryption. The processor 914 may use first few seconds (e.g., first 3 seconds) of the inbound signal to identify a second OTP PIN number used by the other phone device. The first few seconds of the inbound signal may be similar to fax transmission or may include DTMF tones. The processor 914 may identify a second OTP used by the other phone device from the second OTP PIN number, a caller identifier (ID), and/or the DTMF tones. The processor 914 may decrypt the inbound signal to generate a second digital signal using the second OTP key, and may convert the second digital signal to an audio signal. The audio signal may be amplified by the amplifier 916*a* and sent to the audio reproduction device 924 of the phone device 920 for presentation to the user.

Figure 10:
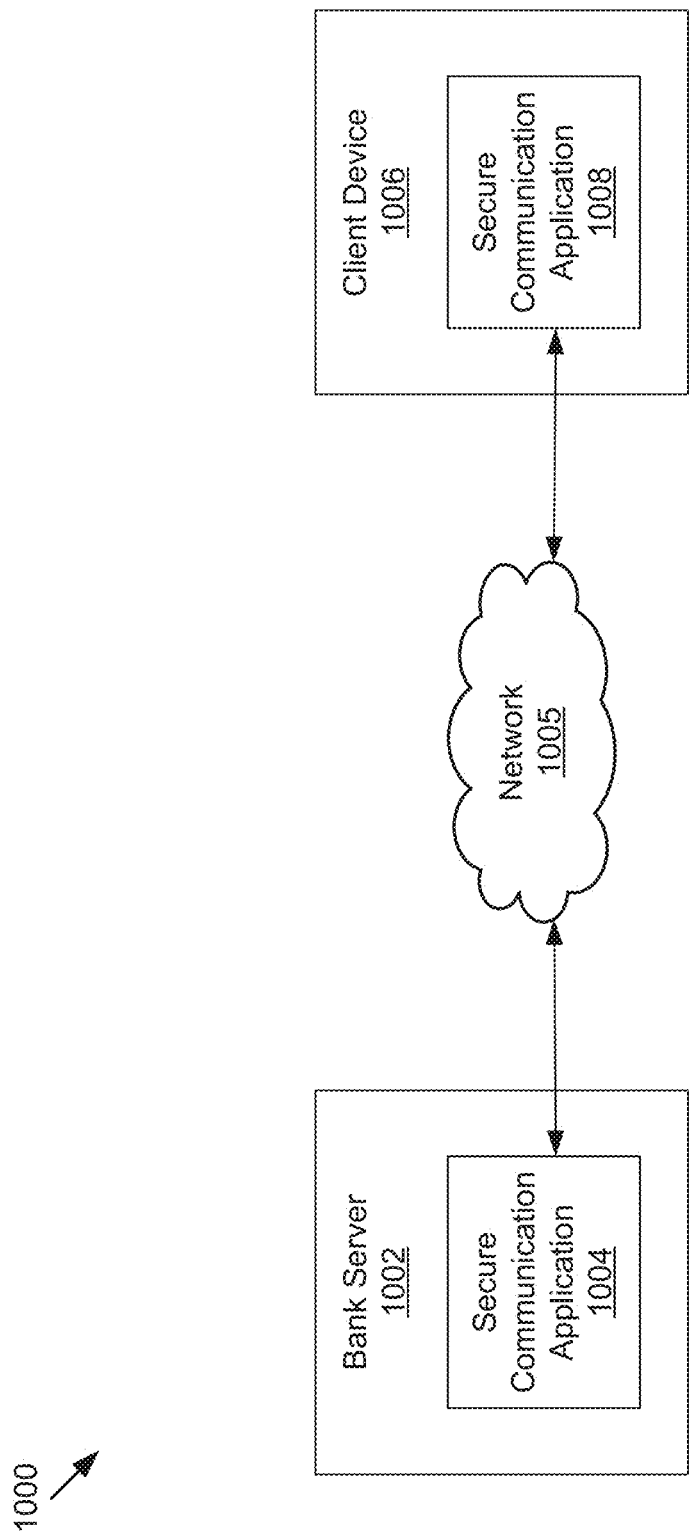
FIG. 10 is a block diagram of an example system configured to establish secure communications between two communication parties.

FIG. 10 is a block diagram of an example system 1000 configured to establish secure communications between two communication parties, arranged in accordance with at least some embodiments described herein. The system 1000 may include a bank server 1002 and a client device 1006 connected via a network 1005. The bank server 1002 may include a secure communication application 1004 (e.g., a KES program). The client device 1006 may include another secure communication application 1008 (e.g., another KES program). The secure communication applications 1004 and 1008 may cooperate with each other to establish secure communications between the bank server 1002 and the client device 1006.

In some embodiments, a bank associated with the bank server 1002 may send a customer associated with the client device 1006 a card along with instructions on how to download an image for creating a custom key or an OTP key. The card may also include expiration information, an OTP PIN number, and other information for key generation. Without loss of generality, the client device 1006 can be a communication party that initiates a communication with the bank server 1002. The secure communication application 1008 of the client device 1006 may retrieve an image (or a video frame) based on the information received from the bank, and may create a custom key from the image. Alternatively or additionally, the secure communication application 1008 may create an OTP key from video frames and/or the OTP PIN number. The OTP PIN number may identify a way to transform the video frames into their digital forms for generation of the OTP keys. The video frames used herein may be from any videos and may be replaced after use for the key generation. Alternatively or additionally, the secure communication application 108 may create an OTP key from the custom key.

The secure communication application 1008 may encrypt a message using the OTP key and/or a subject line of the message using the custom key. For example, first 100 characters of the message may be encoded using the custom key, and other characters may be encoded using the OTP key.

The secure communication application 1004 of the bank server 1002 may perform similar operations to create the custom key and/or the OTP key from the video frames or images, and may decode the message from the secure communication application 1008 using the custom key and/or the OTP key.

Figure 11:
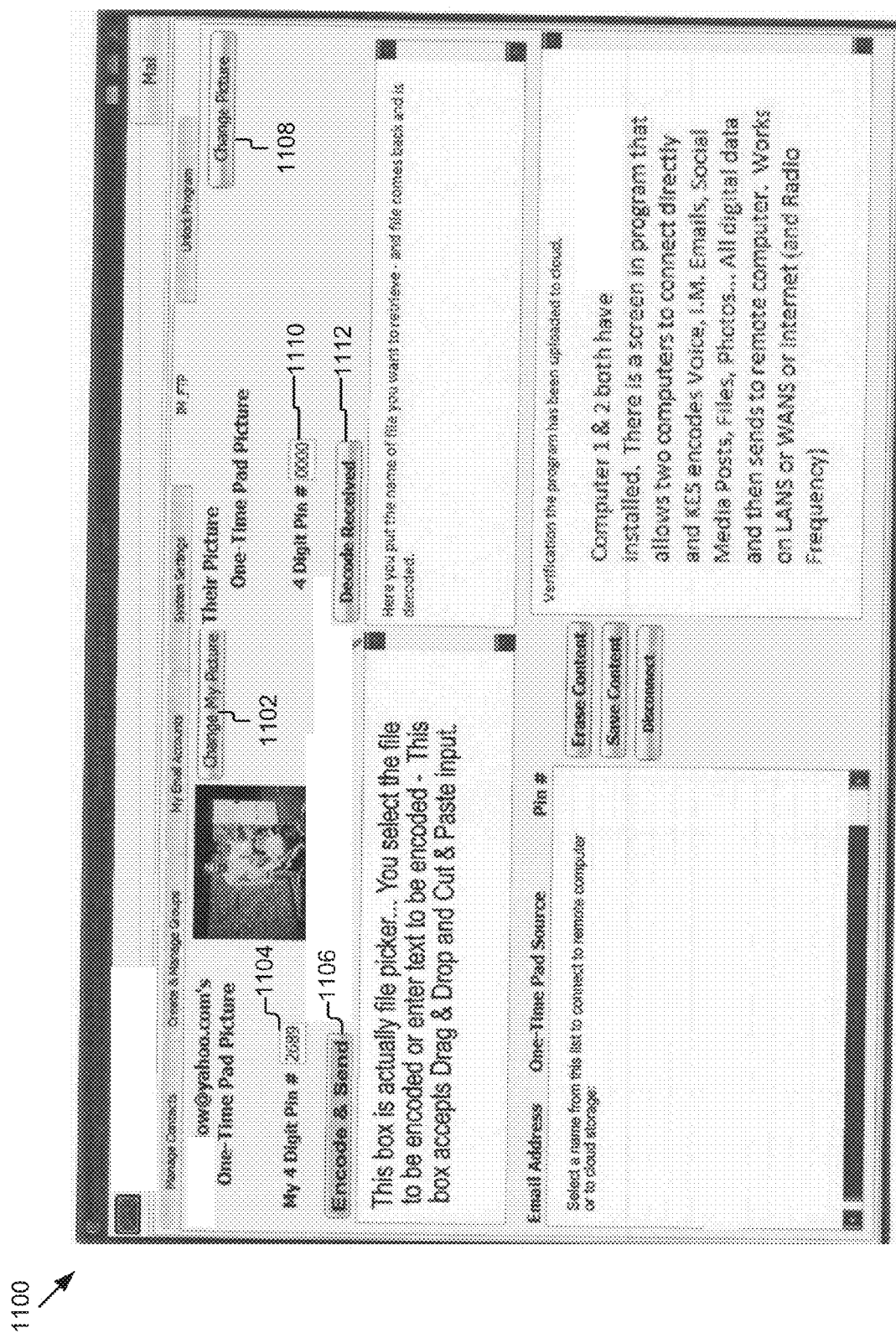
FIG. 11 includes a graphic representation that illustrates an example graphic user interface (GUI) for secure email communications.

FIG. 11 includes a graphic representation 1100 that illustrates an example graphic user interface (GUI) for secure email communications, arranged in accordance with at least some embodiments described herein. A user may select his image for generating his own OTP key via a button 1102. The user may input an OTP PIN number via a field 1104. The user may input his message and select a button 1106 to encode and send his message to another user using his OTP key.

The user may retrieve an image used by another user from a button 1108, and may input the corresponding OTP PIN number in a field 1110. The user may select a button 1112 to decode a received message using the retrieved image and the corresponding OTP PIN number.

Figure 12:
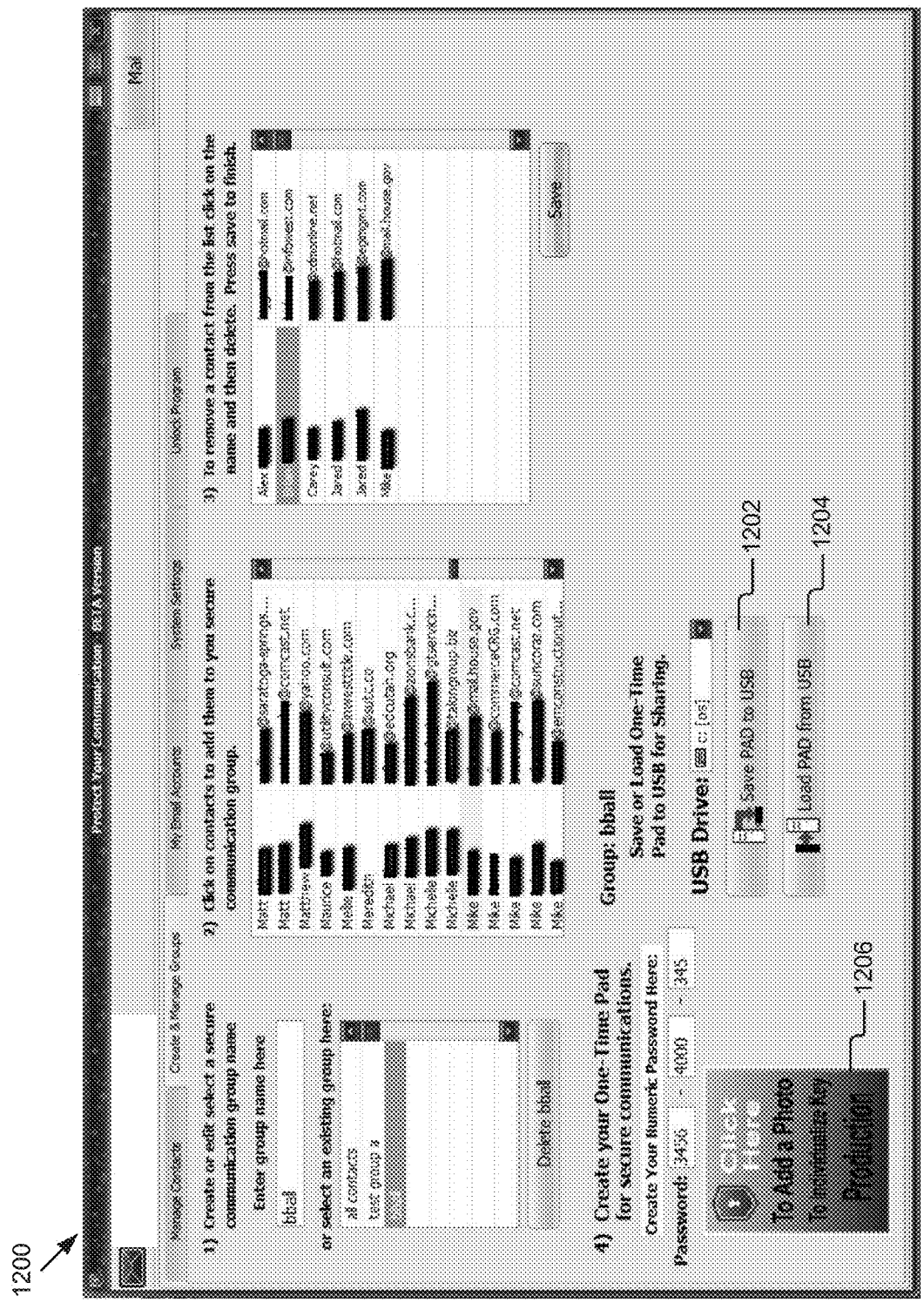
FIG. 12 includes a graphic representation that illustrates an example GUI for creating a group and OTP keys for the group.

FIG. 12 includes a graphic representation 1200 that illustrates an example GUI for setting up a group and creating a custom key and/or OTP keys for the group, arranged in accordance with at least some embodiments described herein. A user may create a new group or edit an existing group. For example, the user may create a new group name or edit an existing group name. The user may add contacts to the group or remove contacts from the group. The user may create a numeric password (e.g., an OTP PIN number) for the creation of OTP keys. The user may also save the created OTP keys to a USB by selecting an item 1202. In some embodiments, the user may also load OTP keys from the USB by selecting an item 1204. The user may also choose a photo for the key creation by selecting an item 1206.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of sharing secure content in a group, the method comprising:
receiving a one-time pad (OTP) key;
encrypting content using the OTP key, wherein the encrypting includes:
generating intermediate codes from the content and the OTP key, the generating the intermediate codes from the content and the OTP key including (i) converting characters in the content to first American Standard Code for Information Interchange (ASCII) numerical values, (ii) converting characters in the OTP key to second ASCII numerical values, and (iii) adding the first ASCII numerical values to the second ASCII numerical values to generate the intermediate codes such that each intermediate code includes a sum of a corresponding first ASCII numerical value and a corresponding second ASCII numerical value; and
adding, via a single operation, the single operation consisting of arithmetic addition, a common constant to each of the intermediate codes to generate a corresponding encrypted code that includes a predetermined number of digits; and
sending encrypted content that includes encrypted codes corresponding to the intermediate codes.

2. The method of claim 1, wherein the encrypted content includes an information section that includes an identifier of a group associated with the OTP key, an identifier of the OTP in the group, and an identifier of a portion of the OTP used to encrypt the content.

3. The method of claim 1, further comprising:
generating a group of OTP keys from one or more key sources; and
storing the group of OTP keys, wherein the OTP key is a key from the group of OTP keys.

4. The method of claim 3, wherein the one or more key sources include at least one of an image, a file, or a web page.

5. The method of claim 1, wherein the content includes one of an email, an email attachment, a document, a file, a text message, or a secure socket layer communication.

6. The method of claim 1, wherein the content includes audio data and generating intermediate codes from the content and the OTP key comprises:
converting the audio data into a digital signal; and
encrypting the digital signal using the OTP key to generate the intermediate codes.

7. The method of claim 6, further comprising:
receiving the encrypted content that includes the encrypted codes corresponding to the intermediate codes;
obtaining the intermediate codes from the encrypted codes;
decrypting the intermediate codes using the OTP key to obtain the digital signal; and
converting the digital signal to the audio data.

8. A method of generating keys in a group, the method comprising:
receiving a digital stream of data that describes a key source;
deleting some data from the digital stream of data;
converting a remainder portion of the digital stream of data to numerical values that satisfy a key range;
converting the numerical values to corresponding characters;
generating a unique secret key that includes the corresponding characters, the unique secret key including a custom key; and
creating a one-time pad (OTP) key from a pre-shared key group using the custom key and a group name, wherein creating the OTP key from the pre-shared key group using the custom key and the group name includes:
retrieving a first name character and a second name character from the group name;
determining a character retrieval position in the custom key based on the first name character and the second name character;
retrieving multiple groups of characters from the custom key starting from the character retrieval position;
updating the character retrieval position by a total number of characters in the multiple groups of characters;
converting the multiple groups of characters to multiple integers;
selecting multiple keys from the pre-shared key group based on the multiple integers;
retrieving key characters from the multiple keys based on the custom key; and
adding the key characters from the multiple keys to the OTP key.

9. The method of claim 8, wherein:
the numerical values represent American Standard Code for Information Interchange (ASCII) numerical values that satisfy the key range; and
the corresponding characters include ASCII characters that correspond to the numerical values.

10. The method of claim 8, wherein the key source includes an image and the remainder portion of the digital stream of data includes data values used to render the image.

11. The method of claim 8, wherein the key source includes a web page and the remainder portion of the digital stream of data includes data values used to render the web page.

12. The method of claim 8, further comprising:
creating the one-time pad (OTP) key using the custom key and a pseudo-random number generator.

13. A computer program product comprising a non-transitory computer-readable medium including computer-readable instructions stored thereon, wherein execution of a first portion of the computer-readable instructions on a first client device causes the first client device to:
receive a digital stream of data that describes a common key source;
generate a custom key from the common key source;

create a group of OTP keys using the custom key;
encrypt content using an OTP key from the group of OTP keys and encrypt content using a summation of a common constant and an intermediate code, the summation of which is a single operation consisting of arithmetic addition of two numerical values; and
communicate the encrypted content and an identifier of the OTP key from the first client device to a second client device, the identifier of the OTP key configured to identify the OTP key from the group of OTP keys; and
wherein execution of a second portion of the computer-readable instructions on the second client device causes the second client device to:
receive the digital stream of data that describes the common key source;
generate the custom key from the common key source;
create the group of OTP keys using the custom key;
receive the encrypted content and the identifier of the OTP key from the first client device;
identify the OTP key from the group of OTP keys using the identifier of the OTP key; and
decode the encrypted content using the OTP key.

14. The computer program product of claim 13, wherein:
the common key source includes an image;
the digital stream of data includes data values used to render the image; and
generating the custom key from the common key source comprises:
converting the data values to numbers that satisfy a key range, wherein the numbers represent American Standard Code for Information Interchange (ASCII) values that satisfy the key range; and
converting the numbers to ASCII characters, wherein the first unique secret key includes the ASCII characters.

15. The computer program product of claim 13, wherein the group of OTP keys is created further based on a pseudorandom number generator.

16. The computer program product of claim 13, wherein the common key source includes one of an image, a file, a document, or a web page.

17. The computer program product of claim 13, wherein the group of OTP keys is created further based on a group name.

* * * * *